(12) United States Patent
Govindassamy

(10) Patent No.: US 10,154,455 B1
(45) Date of Patent: Dec. 11, 2018

(54) METHOD AND APPARATUS FOR BROADCAST INFORMATION TRANSMISSION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 169 days.

(21) Appl. No.: 15/233,488

(22) Filed: Aug. 10, 2016

(51) Int. Cl.
| | |
|---|---|
| *H04W 52/02* | (2009.01) |
| *H04H 20/38* | (2008.01) |
| *H04W 64/00* | (2009.01) |
| *H04W 68/02* | (2009.01) |
| *H04W 36/04* | (2009.01) |
| *H04W 76/28* | (2018.01) |
| *H04W 4/80* | (2018.01) |
| *H04W 84/12* | (2009.01) |
| *H04W 88/04* | (2009.01) |
| *H04W 84/04* | (2009.01) |

(52) U.S. Cl.
CPC ........ *H04W 52/0209* (2013.01); *H04H 20/38* (2013.01); *H04W 4/80* (2018.02); *H04W 36/04* (2013.01); *H04W 64/003* (2013.01); *H04W 68/02* (2013.01); *H04W 76/28* (2018.02); *H04W 84/042* (2013.01); *H04W 84/12* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 7,020,438 B2 * | 3/2006 | Sinivaara | ............... | H04B 7/022 370/332 |
| 7,020,439 B2 * | 3/2006 | Sinivaara | ............... | H04B 7/022 370/332 |
| 8,219,118 B2 | 7/2012 | Kim et al. | | |
| 8,521,194 B2 | 8/2013 | Laroia et al. | | |
| 8,804,655 B2 * | 8/2014 | Rue | ........................ | H04W 36/02 370/331 |
| 8,806,530 B1 | 8/2014 | Izdepski et al. | | |
| 8,923,244 B2 * | 12/2014 | Tinnakornsrisuphap | .................... | H04W 36/04 370/331 |
| 9,119,153 B2 | 8/2015 | Deivasigamani et al. | | |

(Continued)

*Primary Examiner* — Tuan A Tran
(74) *Attorney, Agent, or Firm* — Lerner, David, Littenberg, Krumholz & Mentlik, LLP

(57) ABSTRACT

Internet, voice calls, and messaging services have become ubiquitous and the means by which the services are accessed varies widely. The number and types of devices that may use these services have also proliferated. To serve a number and variety of client devices, a mobile Hotspot may be used, which is a device that may include a modem for mobile broadband access and a short range wireless link to distribute the services to local devices which may have such connectivity. Power consumption of battery powered client devices is an important consideration. A method and apparatus are disclosed that enable a client device to receive broadcast information about the mobile networks from a mobile Hotspot over a short range wireless link which may reduce power consumption of client devices.

55 Claims, 19 Drawing Sheets

(56) References Cited

U.S. PATENT DOCUMENTS

| | | | |
|---|---|---|---|
| 9,491,678 B2* | 11/2016 | Cui | H04W 36/30 |
| 9,516,564 B2* | 12/2016 | Cui | H04W 80/04 |
| 9,549,343 B2* | 1/2017 | Cui | H04W 28/08 |
| 9,723,536 B2* | 8/2017 | Wang | H04W 36/38 |
| 9,730,157 B2* | 8/2017 | Puranik | H04W 52/0212 |
| 2004/0137908 A1* | 7/2004 | Sinivaara | H04B 7/022 |
| | | | 455/452.1 |
| 2004/0202141 A1* | 10/2004 | Sinivaara | H04B 7/022 |
| | | | 370/338 |
| 2008/0080407 A1 | 4/2008 | Abbate et al. | |
| 2009/0059795 A1 | 3/2009 | Fonseca, Jr. et al. | |
| 2009/0157799 A1 | 6/2009 | Sukumaran et al. | |
| 2011/0194530 A1* | 8/2011 | Tinnakornsrisuphap | |
| | | | H04W 36/04 |
| | | | 370/331 |
| 2012/0142328 A1 | 6/2012 | Awoniyi et al. | |
| 2013/0137423 A1* | 5/2013 | Das | H04W 12/08 |
| | | | 455/426.1 |
| 2013/0301451 A1 | 11/2013 | Siomina et al. | |
| 2014/0050086 A1 | 2/2014 | Himayat et al. | |
| 2014/0066132 A1 | 3/2014 | Burke et al. | |
| 2015/0018010 A1 | 1/2015 | Fischer | |
| 2015/0163041 A1 | 6/2015 | Kodali et al. | |
| 2015/0208457 A1 | 7/2015 | Thanayankizil et al. | |
| 2016/0227351 A1 | 8/2016 | Gu et al. | |

\* cited by examiner

METHOD AND APPARATUS FOR BROADCAST INFORMATION TRANSMISSION

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data rates it is often referred to as broadband internet service. Broadband internet service is generally understood to be a service that is always on and offers data rates in the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc. These types of devices are collectively referred herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, Bluetooth™, or some other local area networking schemes. Such short range wireless networks are referred herein as Short Range Wireless Links (SRWL). When a client device is in the proximity of a location where such a SRWL access is available, it may access the internet using the SRWL. FIG. 1 illustrates an example scenario of client devices accessing internet over a WLAN SRWL, which is connected to a traditional wire-line internet service such as DSL or cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless communication networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device may include both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be a single Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is in the vicinity of a Hotspot AP, it may use internet service from the Hotspot as illustrated in FIG. 1. In another smartphone example, the mobile broadband modem, the WLAN AP and the Application Processor may be integrated into a single Integrated Circuit (IC) as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a machine type client device which may have only a WLAN access. In another smartphone mobile Hotspot example, the mobile broadband modem, the WLAN AP and the Application Processor may be integrated into a single IC as shown in FIG. 7.

An example of a mobile broadband network is the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for Hotspot, mobile Hotspot, and mobile networks.

Although a Hotspot or mobile Hotspot may be able to obtain internet service and distribute it to multiple client devices in a given local area, it may not be able to provide other key services that users commonly use. For example, voice calls and SMS based text messaging remain two of the most commonly used applications in client devices. A client device accessing internet through a Hotspot or mobile Hotspot may still be receiving voice calls or SMS based text messages directly through the WWAN as illustrated in FIG. 8. Four interconnected networks are shown in FIG. 8: Public Switch Telephone Network (PSTN) 802, WWAN 804, internet 806, and WLAN (Hotspot) 808. The PSTN is connected to the WWAN through the interface 820 and to the internet through the interface 822. The WWAN and internet are connected through the interface 818. The Cable modem 812 is connected to the internet through the interface 824. These interfaces may use open industry standards or may use proprietary standards. The Hotspot, in the present example, is connected to the internet using a Cable modem interface. In the present example, the Smartphone 811 is connected to the Hotspot Access Point 810 for internet service through the Cable modem 812. Simultaneously, it is also connected to the WWAN 804 for voice calls and SMS based text messaging. The Smartphone 811 may exchange SMS based text messages with the Smartphone 814 over the WWAN 804. The Smartphone 811 may have voice calls with the landline phone 816 through WWAN 804 and PSTN 802. The cordless phone 826 may access the conventional landline voice service through the cordless base 828 which in turn is connected to the PSTN 802 though the conventional landline interface 830. The coverage area 808 of the WLAN Hotspot and the coverage area 832 of the cordless base 832 may partially or fully overlap.

Although aspects of the present disclosure are illustrated using a particular type of mobile Hotspot, the disclosure may be applicable to other types of mobile Hotspot devices, some of which are listed in an earlier section of the present disclosure. In the remainder of the present disclosure a mobile Hotspot is used as an example. A mobile Hotspot may obtain the primary internet service through a cable modem, DSL or MB modem. When a mobile Hotspot is an area where it may receive primary internet service from cable modem or DSL, it may use the internet service from that source. When a mobile Hotspot is an area where it does not have access to receive primary internet service from cable modem or DSL, it may use the internet service from WWAN. When a client device is receiving internet service from a mobile Hotspot, it may still be connected to the WWAN for receiving other services such as voice calls, SMS, etc.

Typically, as shown in FIG. 9, a WWAN comprises elements such as client devices or mobile stations and one or more base stations. Other network devices may also be employed, such as a mobile switching center (not shown). As illustrated in FIG. 9, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred herein as a "message."

A base station to which the client device may be downlink synchronized and/or communicating with at any given time is referred herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive. Such information is herein referred to as "broadcast messages."

Typically in a wireless communication system a base station may group the system information and each group of system information may be transmitted as multiple broadcast messages and such broadcast messages are herein referred as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred herein as "change-mark" is generally included in the SI messages. Client devices may store the change-mark of the SIs it has decoded. If the new SI is transmitted by a cell, it may increment the change-mark to enable the client terminal to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIBs. This alternating sequence of sleep and wake-up in idle mode is referred herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but not limited to the tracking area identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the TACs of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is illustrated in FIG. 10 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred herein as Tracking Area Update (TAU) procedure. With this method, a client device performs TAU only when there is a change in TAI of the cell from which it is getting service. For example, in FIG. 10, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

As long as a client device is in the same registration area, the client device may not perform network registration procedure again except that a periodic network registration update procedure may need to be performed even if the client device continues to move within the same registration area. If the client device moves to a cell which does not belong to the registration area in which the client device is registered, then the client device may perform network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and a paging cycle. The network may transmit a paging message addressed to a specific client device in its specific paging occasion. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay.

When a client device is connected to a mobile Hotspot for internet service, it still may be connected to a WWAN for other services such as voice and SMS. The client device and the mobile Hotspot may be camped on the same cell of the same WWAN, and both the devices may be decoding the same broadcast information (SIBs). This may be a redundant reception since most of the client devices which are connected to the mobile Hotspot may be camped on the same cell of the same WWAN.

SUMMARY

A method and apparatus are disclosed such that a mobile Hotspot may be the only device that decodes the broadcast information from the WWAN and relays the WWAN broadcast information to the client devices over the SRWL. This may enable the client devices to avoid having to decode the broadcast information directly from the WWAN. As power consumption of client devices may be more critical, the relaying of the system information from the mobile Hotspot may be a more power efficient method for a client device to receive the required system information.

In accordance with an aspect of the present disclosure, a method for communication of Wireless Wide Area Network (WWAN) broadcast information in a wireless communication network may include controlling, by a processing device, transmitting a first WWAN broadcast information message from a hotspot device, over a communication connection, to a client device, and receiving, at the hotspot device, over the communication connection, a second WWAN broadcast information message transmitted from the client device, responsive to the first WWAN broadcast information message, wherein the first and second WWAN broadcast information messages indicate first and second WWAN capabilities respectively of the hotspot device and the client device, and in which the communication connection is a Short Range Wireless Link (SRWL) or a wired connection.

In one alternative, the first and second WWAN capabilities may indicate first and second Radio Access Technologies (RAT) types supported respectively by the hotspot device and the client device.

In one alternative, the first and second WWAN capabilities may support at least one of Code Division Multiple Access (CDMA), Global System for Mobile communication (GSM), Long Term Evolution (LTE) from the 3rd Generation Partnership Project (3GPP) or General Packet Radio Service (GPRS).

In one alternative, the first and second WWAN broadcast information messages may indicate at least one of current WWAN identity, Radio Access Technology (RAT) type, Cell Identity (CID), Tracking Area Identity (TAI), frequency of a channel, a default Discontinuous Reception (DRX) cycle or paging cycle for a cell on which respectively the hotspot device and the client device is camped.

In one alternative, the method may include controlling, by the processing device, when the mobile Hotspot and the client device are currently camped on to a same cell of a same Radio Access Technology (RAT) type on a same frequency, determining whether to broadcast base station broadcast system information (SI) to the client device based on a change in the SI from the same cell.

In one alternative, the method may include controlling, by the processing, when the hotspot device and the client device are currently camped on to the same cell of the same RAT type on the same frequency, transmitting, from the hotspot device, a WWAN Camped-on Cell Information Request message to the client device, receiving, in response to the WWAN Camped-on Cell Information Request message, from the client device a WWAN Camped on Cell Information Response message indicating at least one of RAT type, Cell Identity (CID), Tracking Area Identity (TAI), frequency of a channel, Public Land Mobile Network Identity (PLMN ID) of the cell on which the client device is camped, transmitting a Cellular Broadcast Information Broadcast (CBIBOS) mode entry request from the hotspot device to the client device over the communication connection, and when a CBIBOS mode entry confirmation is received from the client device at the hotspot device responsive to the CBIBOS mode entry request, transmitting current SI information for the same cell from the hotspot device to the client device, in which SI change notification processing and SI channel decode processing are disabled at the client device when the client device is in the CBIBOS mode and connected to the hotspot device.

In one alternative, the method may include controlling, by the processing, when cell reselection is determined to occur in the hotspot device and the client device, determining whether the hotspot device and the client device can continue to be in the CBIBOS mode.

In one alternative, the method may include controlling, by the processing device, when the mobile Hotspot and the client device are currently camped on respectively to different first and second cells having a same Radio Access Technology (RAT) type and on a same frequency, determining whether base station broadcast system information (SI) from the second cell is decodable, when the SI from the second cell is determined not to be decodable, transmitting a first message to the client device over the communication connection that Cellular Broadcast Information Broadcast (CBIBOS) mode is not possible, and when the SI from the second cell is determined to be decodable, transmitting a second message to the client device over the communication connection that the CBIBOS mode is possible and current SI information for the second cell when there is a change in the SI information for the second cell and the hotspot device and the client device are in the CBIBOS mode, in which SI change notification processing and SI channel decode processing are disabled at the client device when the client device is in the CBIBOS mode and connected to the hotspot device.

In one alternative, the method may include controlling, by the processing, when cell reselection is determined to occur in the hotspot device and the client device, determining whether the hotspot device and the client device can continue to be in the CBIBOS mode.

In one alternative, the WWAN Camped on Cell Information Response message may indicate at least one of a change-mark of a most current SI the client device has decoded.

In one alternative, the method may include controlling, by the processing device, when the WWAN Camped on Cell Information Response message is received from the client device at the hotspot device and a determination at the hotspot device is an upcoming SI change or SI change is in progress for the cell on which the client device is camped, decoding the most recent SI from the cell on which the client device is camped after completion of the SI change and, after the decoding, determining whether the CBIBOS mode can be entered.

In one alternative, the method may include controlling, by the processing device, when the WWAN Camped on Cell Information Response message is received from the client device at the hotspot device and a determination at the hotspot device is an upcoming SI change or SI change is in progress for the cell on which the client device is camped, without transmitting an SI message in a storage of the hotspot device, entering the CBIBOS mode, decoding an updated SI from the cell on which the client device is camped after completion of the SI change and transmitting the updated SI to the client device.

In one alternative, the method may include controlling, by the processing device, when the hotspot device and the client device are currently camped on respectively to different first and second cells having a same Radio Access Technology (RAT) type and different first and second frequencies, determining whether base station broadcast system information (SI) from the second cell is decodable with the hotspot device tuned to the second frequency while monitoring the first frequency, when the SI from the second cell is determined to be not decodable, transmitting a first message to the client device over the communication connection that Cellular Broadcast Information Broadcast (CBIBOS) mode is not possible for a given client device camped on to a given cell using a frequency other than the first frequency, and when the SI from the second cell is determined to be decodable, transmitting a second message to the client device over the communication connection that the CBIBOS mode is possible for the client device, and SI information broadcast from the second cell when SI information from the second cell is changed, in which SI change notification processing and SI channel decode processing are disabled at the client device when the client device is in the CBIBOS mode and connected to the mobile hotspot device.

In one alternative, the method may include controlling, by the processing, when cell reselection is determined to occur in the hotspot device or the client device, determining whether the hotspot device and the client device can continue to be in the CIBOBS mode.

In one alternative, the method may include controlling, by the processing device, when the mobile Hotspot and the client device are currently camped on respectively to different first and second cells having different first and second Radio Access Technology (RAT) types, determining whether the second RAT type and each frequency of the second RAT type are supported at the hotspot device and whether SI from the second cell, which requires the hotspot device to tune to a given second frequency of the second cell while the hotspot device monitors a given first frequency of the first cell tuned to the given first frequency while monitoring the given second frequency, is decodable at the hotspot device, when the SI from the second cell is determined to be not decodable, transmitting a first message over the communication connection that Cellular Broadcast Information Broadcast (CBIBOS) mode is not possible for a given client device camped on to a given cell using a RAT type other than the first RAT type, and when the SI from the second cell is determined to be decodable, transmitting a second message to the client device over the communication connection that the CBIBOS mode is possible for the client device, and SI information broadcast from the second cell when SI information from the second cell is changed, in which SI change notification processing and SI channel decode processing are disabled at the client device when the client device is in the CIBOBS mode and connected to the hotspot device.

In one alternative, the method may include controlling, by the processing, when cell reselection is determined to occur in the hotspot device or the client device, determining whether the hotspot device and the client device can continue to be in the CIBOBS mode.

In one alternative, the method may include controlling, by the processing device, when a determination is the hotspot device agrees with the client device on monitoring and decoding base station broadcast system information (SI) for the client device, in which the client device is camped on a same or different cell from a cell on which the hotspot device is camped and using a same or different frequency or Radio Access Technology (RAT) type as the hotspot device, monitoring at the hotspot device a downlink for each agreed upon cell of different frequencies and RAT type.

In one alternative, the method may include controlling, by the processing device, deciding whether to monitor a Paging Occasion (PO) for each of the agreed upon cells on the same or different frequency and RAT type as the hotspot device.

In one alternative, the method may include controlling, by the processing device, determining at the hotspot device POs for all of the agreed upon cells on the same or different frequency and RAT type to determine each non-overlapping PO which the hotspot device can monitor for identifying an SI change for each of the cells agreed upon on the same or different frequency and RAT type.

In one alternative, the method may include controlling, by the processing device, not monitoring by the hotspot device a same PO which the client device is expected to monitor in a given cell, given frequency, or given RAT type.

In one alternative, the method may include controlling, by the processing device, monitoring by the hotspot device one common default Discontinuous Reception (DRX) cycle based PO per given cell, given frequency, or given RAT type.

In one alternative, the method may include controlling, by the processing device, when an overlap in given POs of different cells in the same or different frequencies and RAT types is determined at the hotspot device for the client device, changing a given Discontinuous Reception (DRX) cycle for one or more cells, frequencies, or RAT types to determine whether a change in the DRX cycle changes the POs to avoid POs overlap.

In one alternative, the method may include controlling, by the processing device, when non-overlapping PO for the cells of the same or different frequencies and RAT types is not determined at the hotspot device, transmitting from the hotspot device a first message indicating the non-overlapping determination to the client and exiting Cellular Broadcast Information Broadcast (CBIBOS) mode for the client device.

In one alternative, the method may include controlling, by the processing device, when an overlap with a Paging Occasion (PO) of another cell is determined based on decoding SI for one or more of second cells of the same or different frequencies and RAT types, prioritizing PO decoding on each cell of the second cells of the same frequency and RAT type on which the hotspot device is camped, and for each cell of the second cells on another frequency and RAT type for which the hotspot device determines an overlap of the PO, transmitting to the client device a first message indicating a next PO may not be decodable by the hotspot device and requesting the client device to perform PO decode, and maintaining the hotspot device in Cellular Broadcast Information Broadcast (CBIBOS) mode with the client device.

In one alternative, the method may include controlling, by the processing device, when a determination at the hotspot device is the client device denied the request from the hotspot device for decoding the PO and to continue to be in the CBIBOS mode, exiting the CBIBOS mode with the client device.

In one alternative, the method may include controlling, by the processing device, when an ongoing SI decode is completed at the hotspot device and a determination is a non-overlapping PO exists for one or more of second client devices for which the hotspot device previously exited the CBIBOS mode or could not enter the CBIBOS mode because of previous overlap in the PO due to SI decode, the transmitting at least one of a WAN Camped on Cell Information Request or Enter CBIBOS mode request to the one or more of second client devices as a request to enter the CBIBOS mode.

In one alternative, the method may include controlling, by the processing device, when an overlap with the PO of another cell is determined based on decoding SI for one or more of second cells of the same or different frequencies and RAT types, prioritizing PO decoding each cell of the second cells of other frequency and RAT type, and deferring SI decode for each cell of the second cells camped on a frequency and RAT type of the hotspot device.

In one alternative, the deferring the SI decode may be based on a determination whether delayed decoding of SI impacts normal operation and performance of the hotspot device.

In one alternative, the method may include controlling, by the processing device, not monitoring Paging Occasions (PO) of cells of same or different frequencies and Radio Access Technology (RAT) types by the hotspot device, in which the client device monitors PO in respective cells thereof of the same or different frequencies and RAT types.

In one alternative, the method may include controlling, by the processing device, when a first message is received at the hotspot device from the client device which detects change in base station broadcast system information (SI), notified by the network in the PO, in which the first message indicates change in SI in the respective cell of the same or different frequencies or RAT type, decoding the changed SI in the respective cell and transmitting the decoded SI to the client device.

In one alternative, the method may include controlling, by the processing device, when the hotspot device includes a plurality of M receiver/decoder circuits, decoding in parallel overlapping Paging Occasions (POs) and System Informations (SI) from a plurality of N cells of same or different frequencies and RAT types, in which M and N are the same or different.

In one alternative, the method may include controlling, by the processing device, receiving a first message from the client device indicating the client device exited Cellular Broadcast Information Broadcast (CBIBOS) mode and is to start decoding at least one of a Paging Occasion (PO) or base station broadcast system information (SI) according to a normal process at the client device, in which the first message is transmitted when the client device is out of range of or disconnected from the hotspot device.

In one alternative, the method may include controlling, by the processing device, exiting of a Cellular Broadcast Information Broadcast (CBIBOS) mode at any time and transmitting a third message to the client device indicating the exiting of the CBIBOS mode.

In one alternative, the method may include controlling, by the processing device, entering a Cellular Broadcast Information Broadcast (CBIBOS) mode autonomously at the hotspot device and starting broadcasting current serving cell base station broadcast system information (SI), when a new client device is connected to the hotspot device or the SI in the hotspot device's serving cell is updated or changed and the updated or changed SI is successfully decoded by the hotspot device.

In one alternative, the method may include controlling, by the processing device, when the hotspot device is pre-configured with a set of cells of same or different frequencies and Radio Access Technology (RAT) type for which the hotspot device expected to at least one of monitor or decode base station broadcast system information (SI) change from respective cells, autonomously entering Cellular Broadcast Information Broadcast (CBIBOS) mode at the hotspot device and starting broadcasting SIs for one or more of the pre-configured cells of the same or different frequencies and RAT types.

In one alternative, the method may include controlling, by the processing device, performing base station broadcast system information (SI) broadcasting using a first application being executed in the hotspot device, in which the client device is executing a second application and the first and second applications communicate through a peer to peer protocol on any logical channel of the communication connection.

In one alternative, the first and second applications may be independent of the communication connection and obtained through a virtual communication port established in the hotspot device and the client device.

In one alternative, the method may include controlling, by the processing device, creating a new physical or logical channel as a Cellular Broadcast Information Channel (CBIC) between the hotspot device and the client device dedicated for Cellular Broadcast Information Broadcast (CBIBOS) mode information exchange.

In one alternative, the CBIC may be available for exchange of cellular network information other than base station broadcast system information (SI) between the client device and the hotspot device.

In one alternative, the method may include controlling, by the processing device, when the hotspot device broadcasts a base station broadcast system information (SI) message, prefixing each SI message with a SI change-mark index.

In one alternative, the hotspot device may use a cable modem to provide internet service while using a WWAN modem only for base station broadcast system information (SI) monitoring and decoding purposes.

In one alternative, the method may include controlling, by the processing device, saving in a database of the hotspot device most recent base station broadcast system information (SI) messages decoded for the client device from a cell on a same or different frequencies and same or different Radio Access Technology (RAT) types as a cell on which the hotspot device is camped.

In one alternative, SI messages for R recent camped on or neighbor cells of the same or different frequencies or RAT type SI messages may be saved in the database.

In one alternative, the method may include controlling, by the processing device, maintaining validity of one of the stored SI messages in the database.

In one alternative, the method may include controlling, by the processing device, using valid stored SI information for the cell of the same or different frequencies and RAT type, when the stored SI message is decoded as part of SI monitoring for another client device.

In one alternative, the method may include controlling, by the processing device, when the hotspot device changes a serving cell thereof due to cell selection, cell reselection, cell change or another procedure, broadcasting by the hotspot device of new cell information to the client device.

In one alternative, the method may include controlling, by the processing device, receiving new cell information from the client device at the hotspot device, the new cell information indicating change of serving cell at the client device due to cell selection or cell reselection or cell change or other procedure In one alternative, the method may include controlling, by the processing device, when the hotspot device and the client device are in Cellular Broadcast Information Broadcast (CBIBOS) mode and a cell change occurs in the hotspot device or the client device and the hotspot device is not able to continue the CBIBOS mode with the client device, sending from the hotspot device an Exit CBIBOS mode Request to the client device and exiting the CBIBOS mode with the client device.

In one alternative, the method may include controlling, by the processing device, when the hotspot device receives a cell change notification from the client device and valid base station broadcast system information (SI) for a newly notified cell of same or different frequencies and RAT type is stored at the hotspot device, immediately sending the valid SI information to the client device.

In one alternative, the method may include controlling, by the processing device, when the hotspot device and the client device are in the Cellular Broadcast Information Broadcast (CBIBOS) mode and based on a change in a Paging Occasion (PO) to be monitored for a serving cell of the hotspot device when the hotspot device is not able to continue the CBIBOS mode with the client device, sending an Exit CBIBOS mode Request to the client device and exiting the CBIBOS mode with the client device.

In one alternative, the method may include controlling, by the processing device, receiving at the hotspot device a first message from the client device indicating a changed default Discontinuous Reception (DRX) cycle or paging cycle detected at the client device.

In one alternative, the method may include controlling, by the processing device, processing a selective list of base station broadcast system information (SI) messages received from a serving cell of the client device, to obtain the changed default DRX cycle or paging cycle in the serving cell of the client device and adopting Paging Occasion (PO) monitoring for the serving cell of the client device according to an updated PO.

In one alternative, the method may include controlling, by the processing device, when the PO for the serving cell of the client device is changed to a new PO and the hotspot device cannot continue to monitor the new PO because of overlap in PO, sending an Exit CBIBOS mode Request" to the client device and exiting the CBIBOS mode with the client device.

In accordance with an aspect of the present disclosure, a method for communication of Wireless Wide Area Network (WWAN) broadcast information in a wireless communication network may include controlling, by a processing device, receiving at a client device a first WWAN broadcast information message, over a communication connection, from a hotspot device, and transmitting, to the hotspot device over the communication connection, a second WWAN broadcast information message, responsive to the first WWAN broadcast information message, wherein the first and second WWAN broadcast information messages indicate first and second WWAN capabilities respectively of the client device and the hotspot device, and in which the communication connection is a Short Range Wireless Link (SRWL) or a wired connection.

In one alternative, the method may include controlling, by a processing device, when the client device connects with another hotspot device in a vicinity of the client device which is broadcasting a base station broadcast system information (SI) message for cells of same or different frequencies and Radio Access Technology (RAT) types as the hotspot device, resuming SI decoding at the client device from a pending SI message from the hotspot device instead of waiting for all the SI to be received from the another hotspot device.

In one alternative, the method may include controlling, by a processing device, when the client device disconnects from the hotspot device and is not able to find another hotspot device in a current location of the client device, starting decoding base station broadcast system information (SI) message directly from the WWAN.

In one alternative, the method may include controlling, by a processing device, wherein, when the client device enters a Cellular Broadcast Information Broadcast (CBIBOS) mode, turning off a Radio Frequency (RF) receiver of a cellular modem during a base station broadcast system information (SI) change notification time slot and SI change time slot and entering a power save state.

In accordance with an aspect of the present disclosure, an apparatus for communication of Wireless Wide Area Network (WWAN) broadcast information in a wireless communication network may include circuitry configured to control: transmitting a first WWAN broadcast information message from a hotspot device, over a communication connection, to a client device, and receiving, at the hotspot device, over the communication connection, a second WWAN broadcast information message transmitted from the client device, responsive to the first WWAN broadcast information message, wherein the first and second WWAN broadcast information messages indicate first and second WWAN capabilities respectively of the hotspot device and the client device, and in which the communication connection is a Short Range Wireless Link (SRWL) or a wired connection.

In accordance with an aspect of the present disclosure, an apparatus for communication of Wireless Wide Area Network (WWAN) broadcast information in a wireless communication network may include circuitry configured to control, receiving at a client device a first WWAN broadcast information message, over a communication connection, from a hotspot device, and transmitting, to the hotspot device over the communication connection, a second WWAN broadcast information message, responsive to the first WWAN broadcast information message, wherein the first and second WWAN broadcast information messages indicate first and second WWAN capabilities respectively of the client device and the hotspot device, and in which the communication connection is a Short Range Wireless Link (SRWL) or a wired connection.

In accordance with an aspect of the present disclosure, a wireless communication device may include a receiver to receive a signal of a wireless communication system; and a processing device configured to control communication of Wireless Wide Area Network (WWAN) broadcast information in a wireless communication network. The processing device may be configured to control: transmitting a first WWAN broadcast information message from the wireless communication device as a hotspot device, over a communication connection, to a client device, and receiving, at the wireless communication device, over the communication connection, a second WWAN broadcast information message transmitted from the client device, responsive to the first WWAN broadcast information message, wherein the first and second WWAN broadcast information messages indicate first and second WWAN capabilities respectively of the wireless communication device and the client device, and in which the communication connection is a Short Range Wireless Link (SRWL) or a wired connection.

In accordance with an aspect of the present disclosure, a wireless communication device may include a receiver to receive a signal of a wireless communication system; and a processing device configured to control communication of Wireless Wide Area Network (WWAN) broadcast information in a wireless communication network. The processing device may be configured to control: receiving at the wireless communication device as a client device a first WWAN broadcast information message, over a communication connection, from a hotspot device, and transmitting, to the hotspot device over the communication connection, a second WWAN broadcast information message, responsive to the first WWAN broadcast information message, wherein the first and second WWAN broadcast information messages indicate first and second WWAN capabilities respectively of the wireless communication device and the hotspot device, and in which the communication connection is a Short Range Wireless Link (SRWL) or a wired connection.

DETAILED DESCRIPTION

Figure 1:
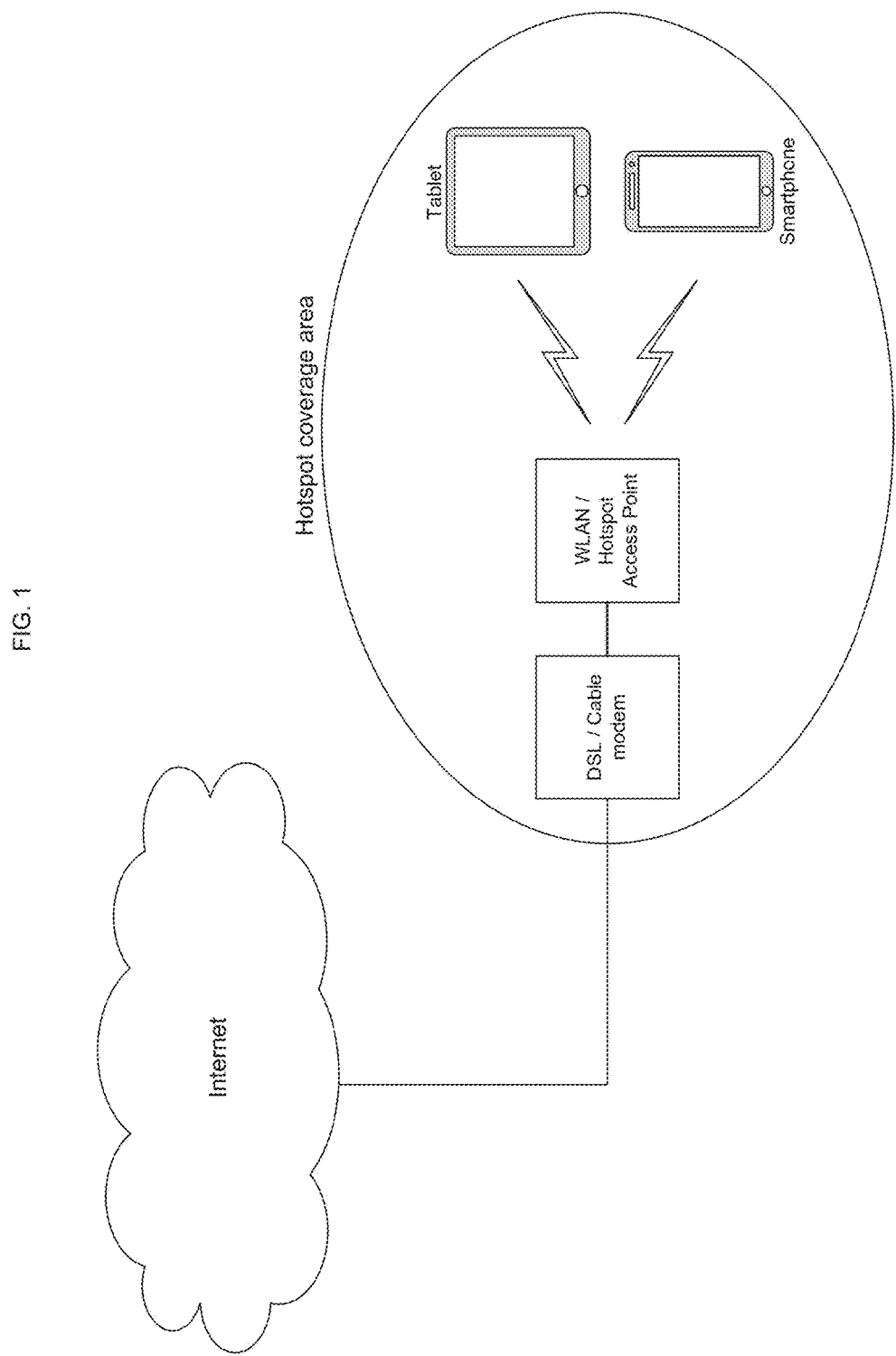
FIG. 1 illustrates an example scenario of internet access using WLAN network over a traditional wire-line internet service.
Figure 2:
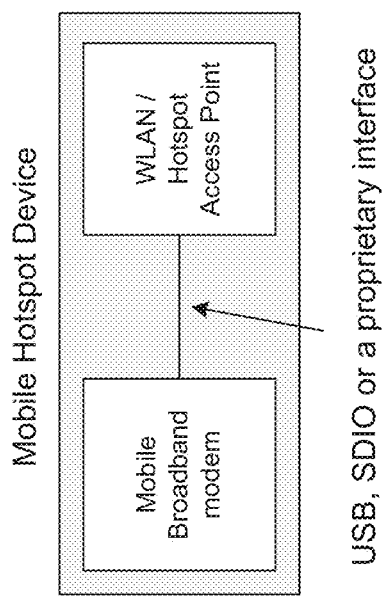
FIG. 2 illustrates a high level block diagram of a mobile Hotspot device.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of mobile Hotspot, the disclosure may be applicable to other types of Hotspots.

Although the aspects of the present disclosure may use the 3GPP LTE as an example for a WWAN used in a mobile Hotspot, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the mobile Hotspot, other SRWL such as Bluetooth™ may be used by a mobile Hotspot.

The types of client devices connected to a mobile Hotspot may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, SMS, etc. from the mobile Hotspot. Another type of device may be a cordless phone inside a home or office which may connect to the mobile Hotspot only for voice calls.

According to an aspect of the present disclosure, the mobile Hotspot and client device may communicate through the SRWL and may exchange their WWAN capabilities such as the RAT type supported by them. For example, the mobile Hotspot and client device may be supporting one or more of the following: CDMA, GSM, LTE, GPRS, etc.

According to an aspect of the present disclosure, the mobile Hotspot and the client device communicate with each other the current WWAN identity (i.e., PLMN ID), the RAT type, the CID, the TAI, the frequency of the channel, default DRX cycle or paging cycle, etc. for the cell they are camped on. If there is more than one client device connected to the mobile Hotspot, each client device communicates to the mobile Hotspot the information about the cell it is camped on.

According to an aspect of the present disclosure, if the mobile Hotspot and a client device are currently camped on to the same cell, namely cell $C_a$, of the same RAT type, on the same frequency, then the mobile Hotspot may determine to broadcast the SI to the client device whenever there is a change in the SI from the current serving cell. At this point, according to an aspect of the present disclosure, both the mobile Hotspot and client devices enter into Cellular Broadcast Information Broadcast over SRWL (CBIBOS) mode in which the client device may disable the SI change notification processing and SI channel decode processing as long as it is connected to the mobile Hotspot and has entered into CBIBOS mode. According to an aspect of the present disclosure, when there is a cell reselection in either mobile Hotspot or client device, then they may communicate with each other to determine whether they can continue to be in the CBIBOS mode or exit it. According to an aspect of the present disclosure, when there is more than one client device connected to the mobile Hotspot, the same procedure is followed for each client device.

Figure 3:
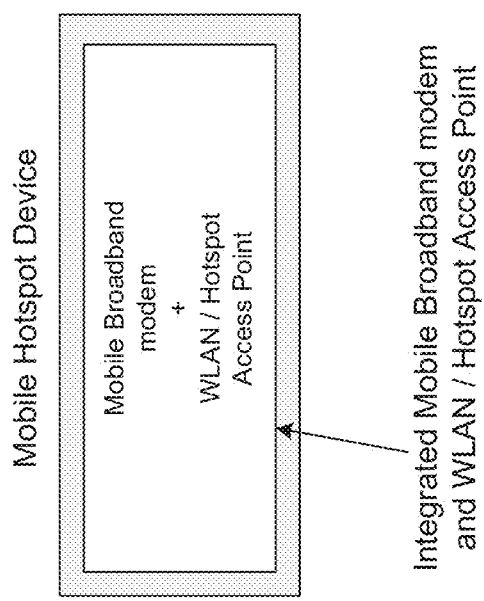
FIG. 3 illustrates a high level block diagram of an example mobile Hotspot device with an integrated mobile broadband modem and WLAN Access Point.
Figure 4:
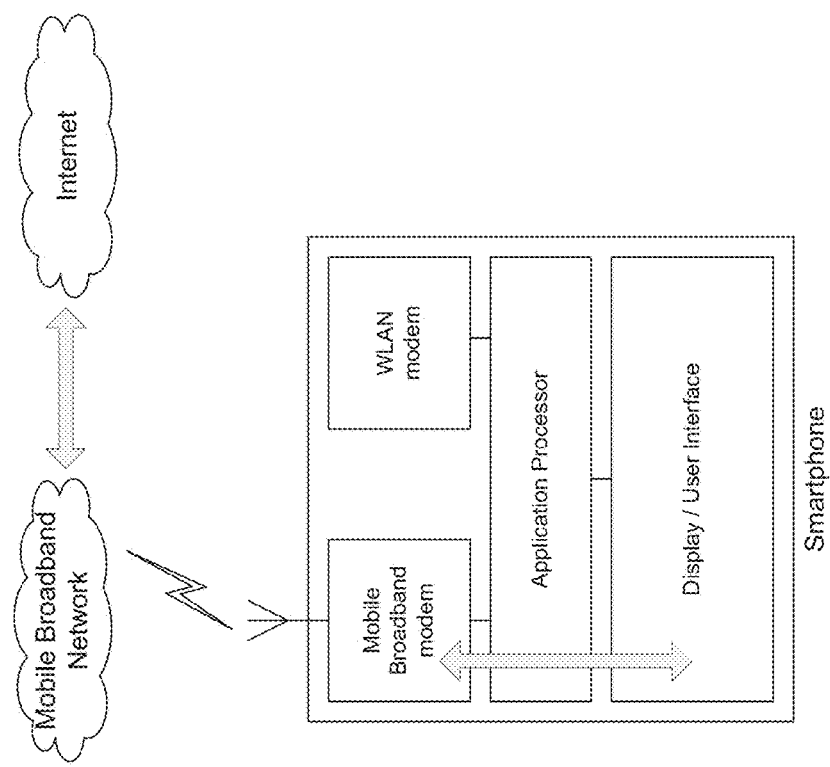
FIG. 4 illustrates a use case of internet access over a mobile broadband network by a smartphone client device.
Figure 5:
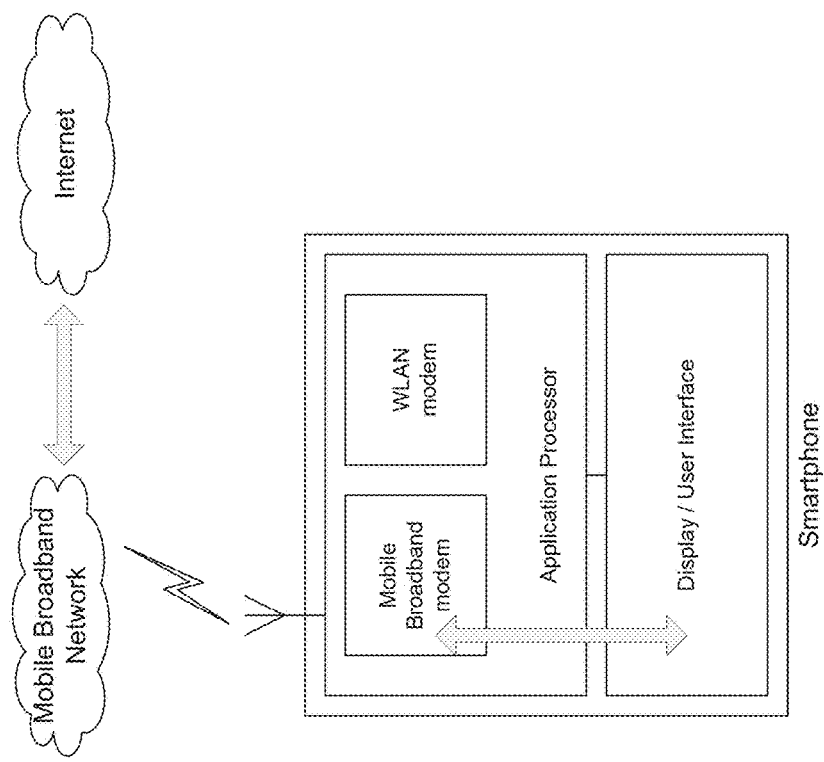
FIG. 5 illustrates a use case of internet access over a mobile broadband network by a smartphone client device with an integrated mobile broadband modem, WLAN Access Point, and Application Processor.
Figure 6:
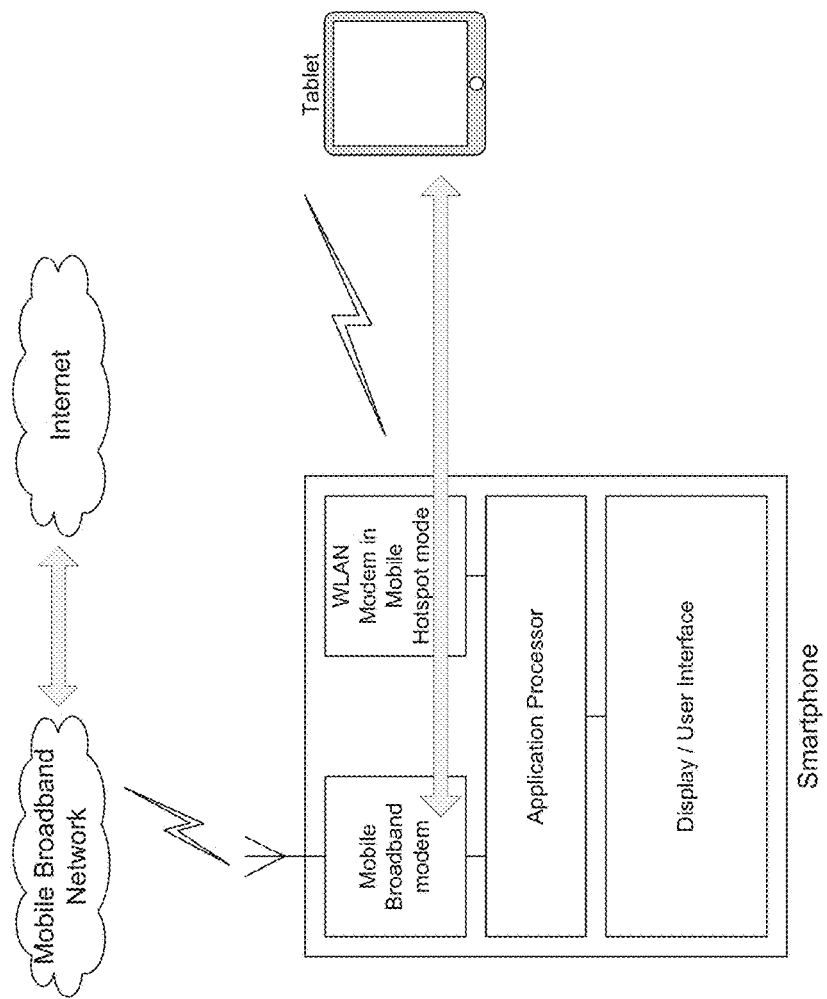
FIG. 6 illustrates a use case of internet access over a WLAN network by a client device through a smartphone operating in mobile Hotspot mode.
Figure 7:
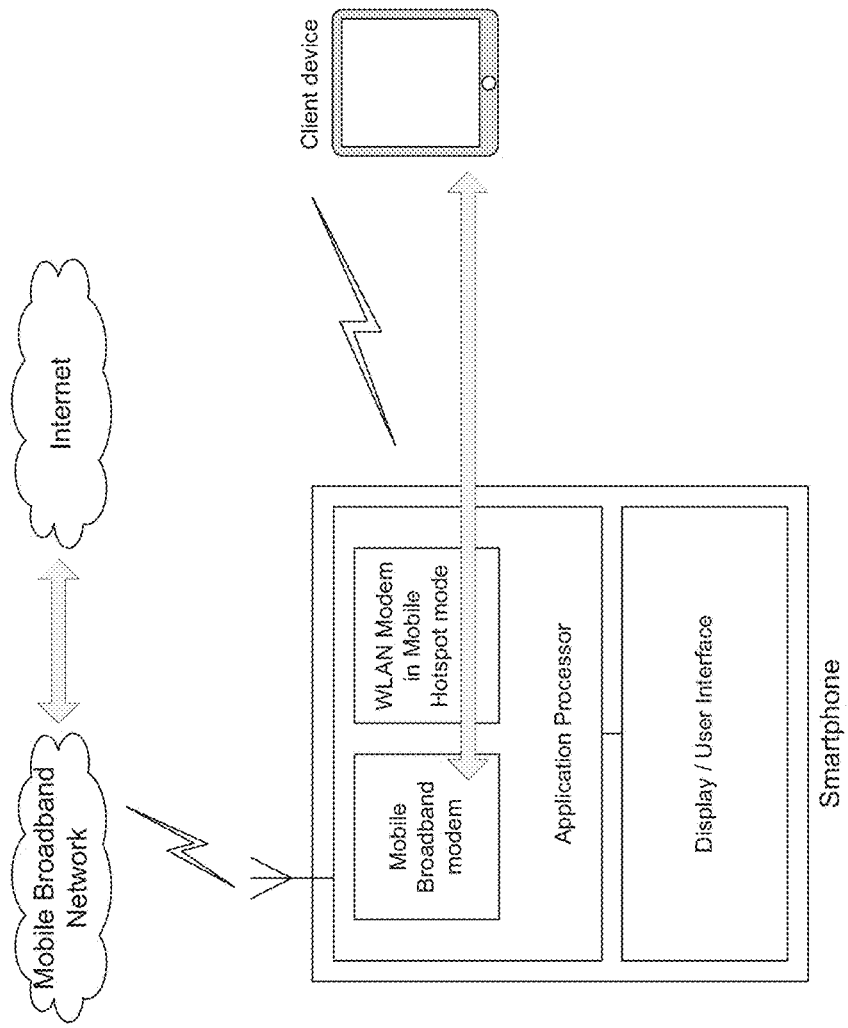
FIG. 7 illustrates a use case of internet access over a WLAN network by a client device through a smartphone operating in mobile Hotspot mode with an integrated mobile broadband modem, WLAN Access Point, and Application Processor.
Figure 8:
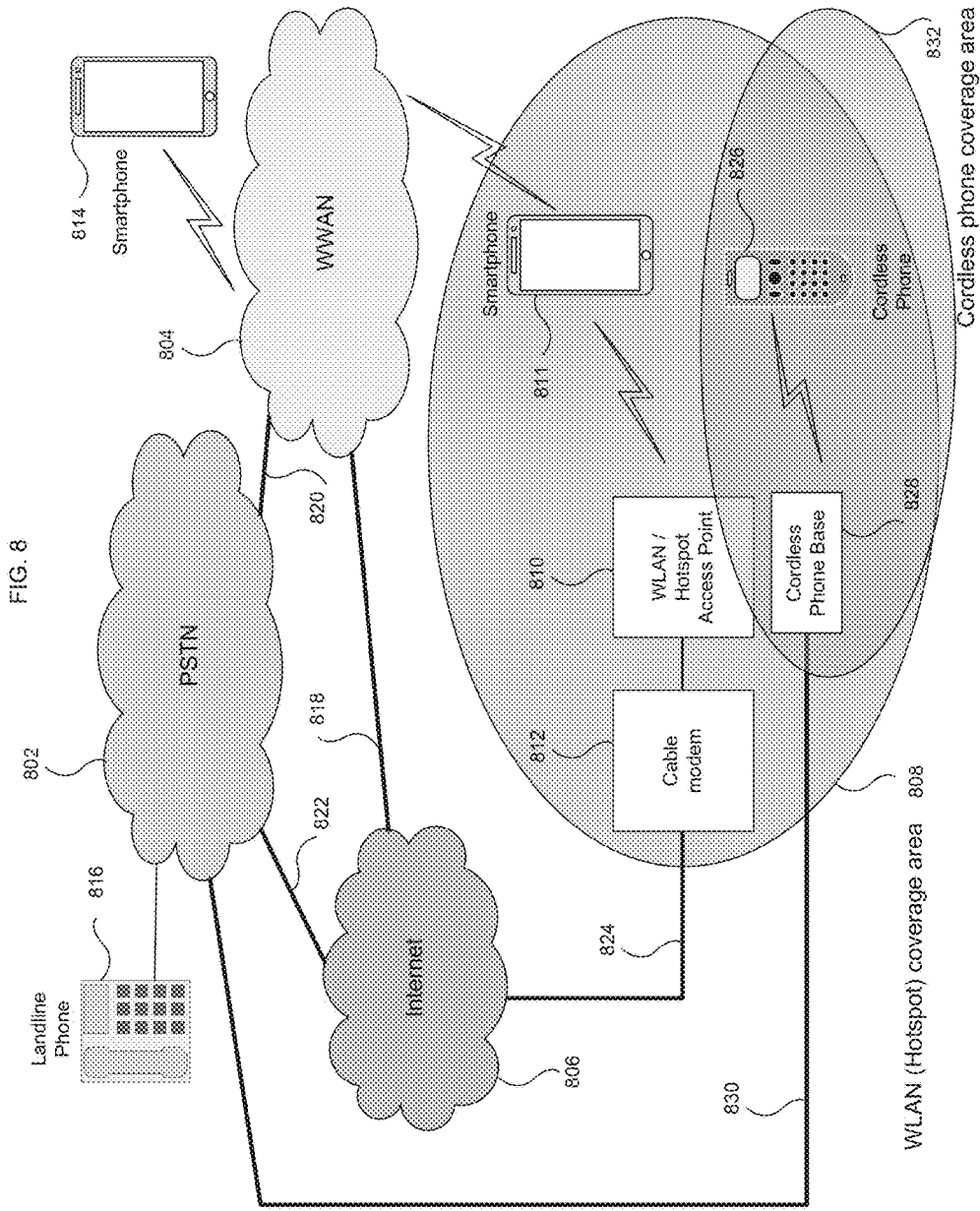
FIG. 8 illustrates a use case of a Smartphone simultaneously connected to different networks for different services.
Figure 9:
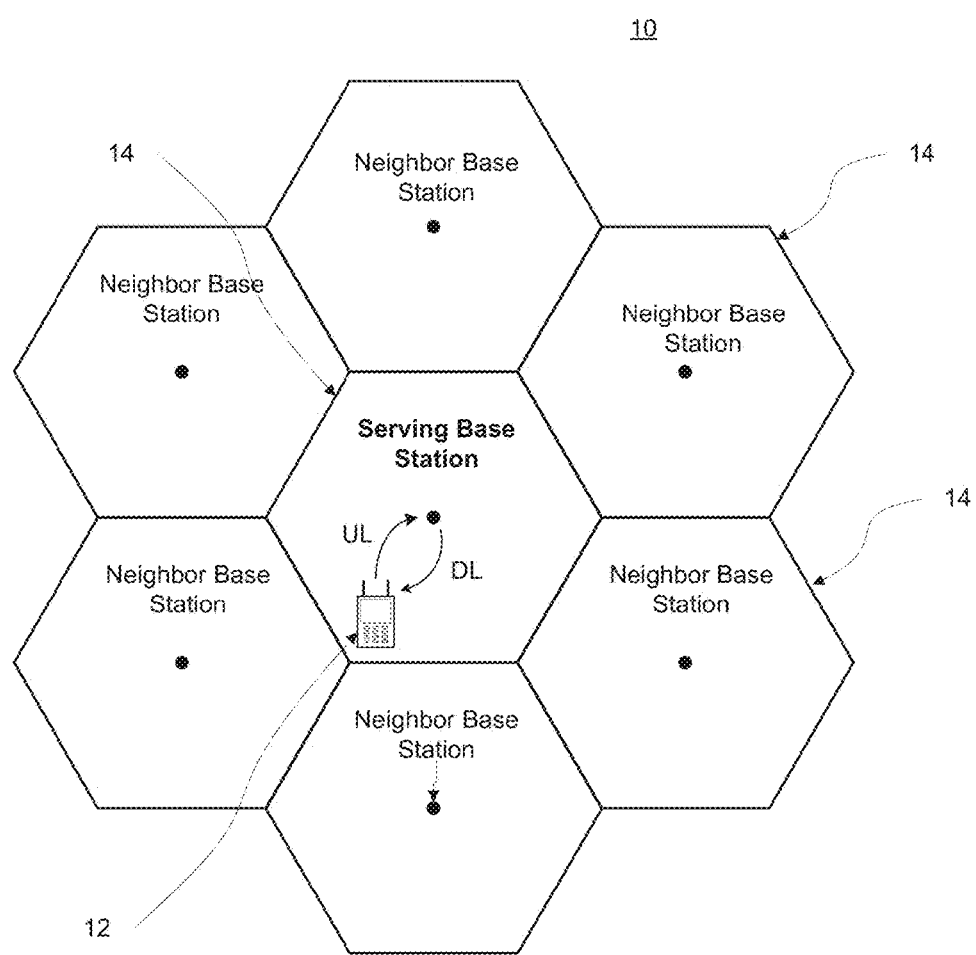
FIG. 9 illustrates a conventional mobile wireless communication system.
Figure 10:
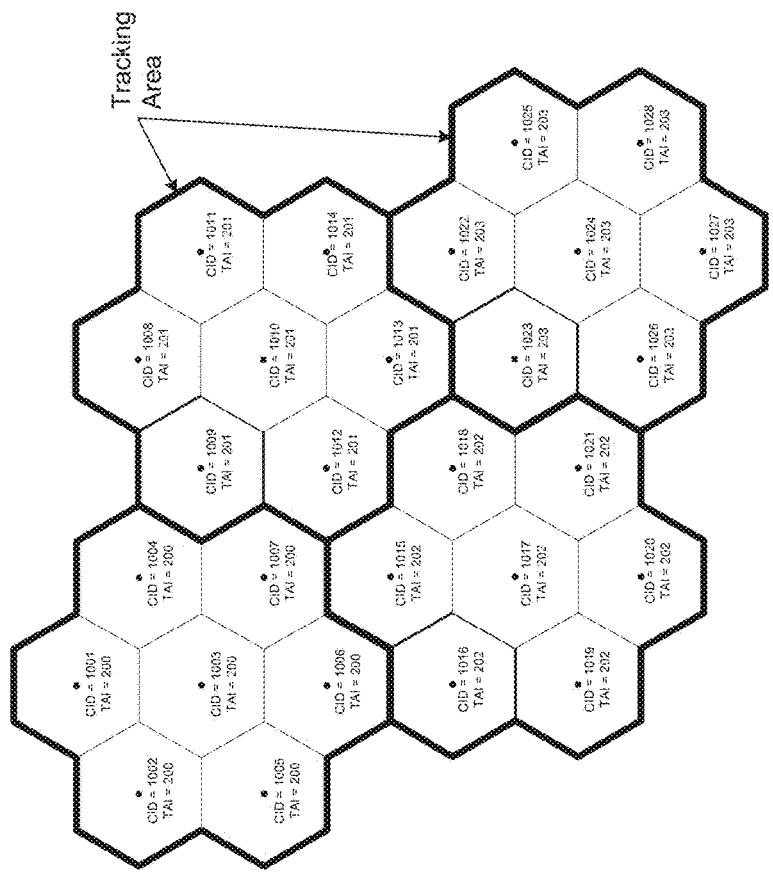
FIG. 10 illustrates the grouping of cells into tracking areas in a wireless communication system.
Figure 11:
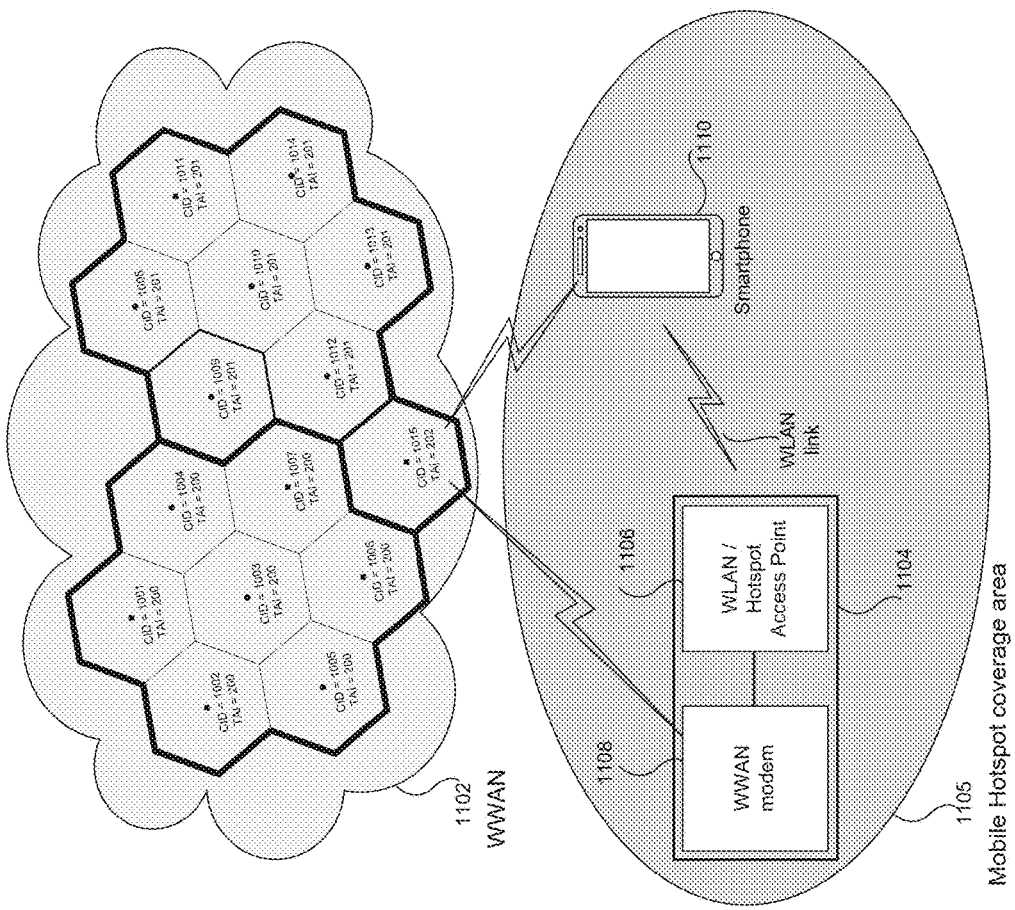
FIG. 11 illustrates an example scenario where the mobile Hotspot and a client device may be camped on the same cell of the same WWAN.
Figure 12:
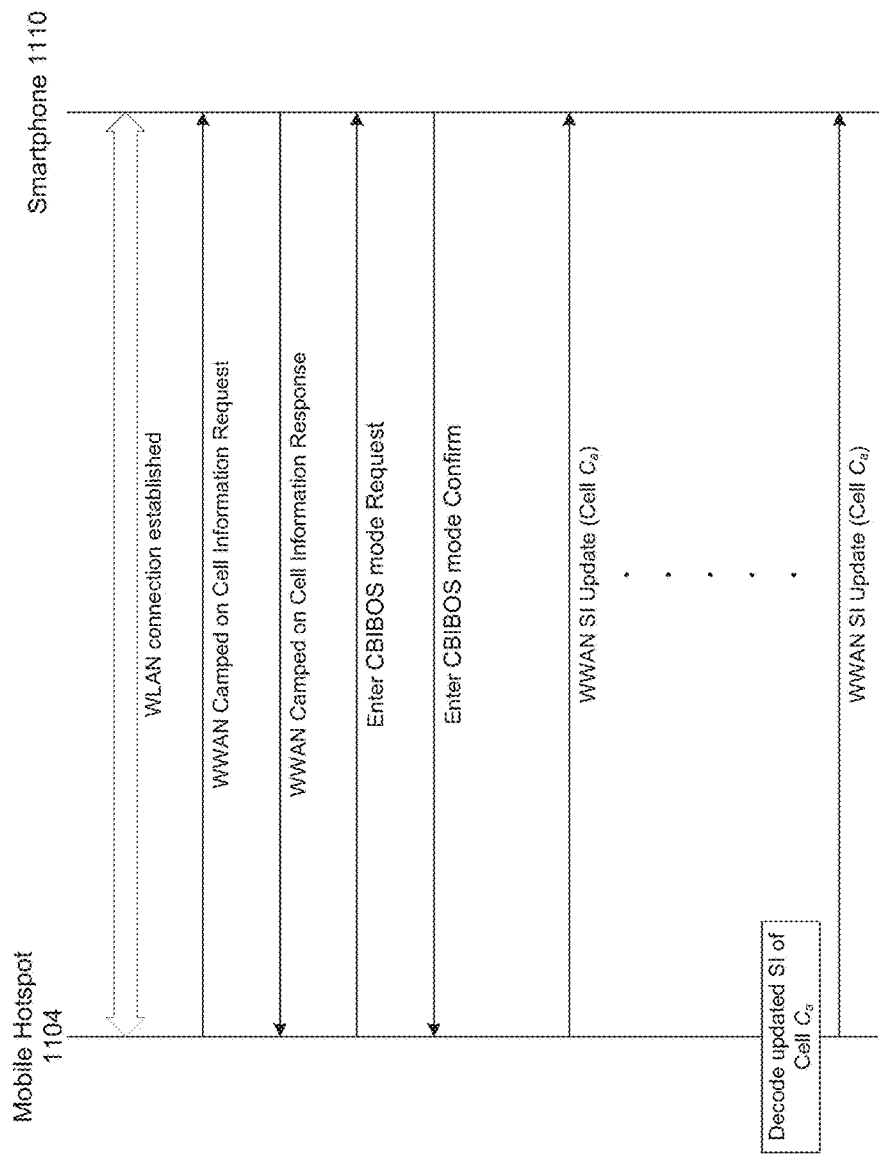
FIG. 12 illustrates a Message Sequence Chart (MSC) for an example scenario for mobile Hotspot broadcasting SI on the WLAN SRWL according to the aspects of the present disclosure.

FIG. 11 illustrates an example scenario for the application of present disclosure. As shown in FIG. 11, WWAN coverage 1102 and mobile Hotspot coverage 1105 are illustrated. The mobile Hotspot 1104 comprises the WLAN Access Point (modem) 1106 and WWAN modem 1108. As illustrated in FIG. 3, in another implementation both WLAN modem and WWAN modem may be a single unit. The WWAN modem 1108 is connected to the cell with CID 1015 in the WWAN 1102. The Smartphone 1110 communicates with the mobile Hotspot over the WLAN link for internet services. The Smartphone 1110 also communicates with the cell with CID 1015 for voice calls, SMS, and other services (except internet) provided by the WWAN 1102. The Message Sequence Chart (MSC) for the messages exchanged between the Hotspot 1104 and the Smartphone 1110 over the WLAN link for entering the CBIBOS mode according to the aspects of the present disclosure is illustrated in FIG. 12. The two entities mobile Hotspot 1104 and the Smartphone 1110 involved in the message exchanges are illustrated at the top. Initially, the WLAN link between the two entities may be established. Next the mobile Hotspot 1104 may send the "WWAN Camped-on Cell Information Request" message to the Smartphone 1110 which in return may send the "WWAN Camped on Cell Information Response" message which may include the CID, TAI, frequency, the RAT type, and the PLMN ID of the cell on which the Smartphone 1110 is camped on. Upon receipt of this information, the mobile Hotspot 1104 may compare it with the corresponding information about the cell it is camped on. In the present example, as illustrated in FIG. 11, both the mobile Hotspot 1104 and the Smartphone 1110 are camped on the same cell, namely cell $C_a$ with CID=1015. Therefore, the mobile Hotspot 1104 may conclude that it is possible to enter the CBIBOS mode and may send a message "Enter CBIBOS mode Request" message to the Smartphone 1110 which in turn may accept the request and send the "Enter CBIBOS mode Confirm" message to the mobile Hotspot 1104. At this point, the mobile Hotspot 1104 may send the most current SI it has for the cell it is camped on to the Smartphone 1110 using the "WWAN SI Update" message. At this point, the Smartphone 1110 may stop receiving any further SI from the WWAN directly. Subsequently, the mobile Hotspot continues to monitor the SI for the cell it is camped on and if the SI has been updated by the WWAN, the mobile Hotspot 1104 sends the updated SI to the Smartphone 1110 using another "WWAN SI Update" message.

Figure 13:
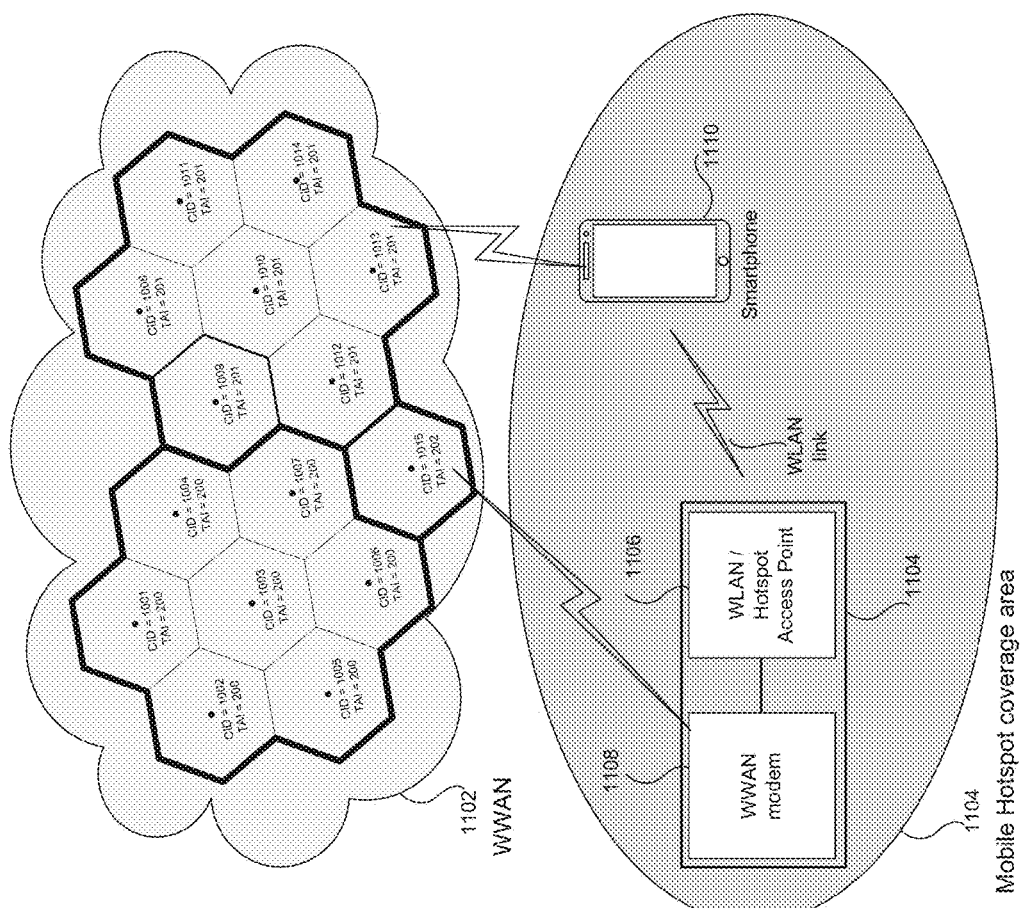
FIG. 13 illustrates an example scenario where the mobile Hotspot and a client device may be camped on different cells of the same WWAN.

According to an aspect of the present disclosure, if the mobile Hotspot and one or more client devices are currently camped on to the cells of the same RAT type, on the same frequency but on different cells, namely $C_a$ and $C_b$ respectively, then the mobile Hotspot may first determine whether it can decode the SI from cell $C_b$. According to an aspect of the present disclosure, if the mobile Hotspot determines that it cannot decode the broadcast SI from cell $C_b$ then it may communicate to the one or more client devices that CBIBOS mode may not be possible for those client devices which are camped on cells different from that of the mobile Hotspot. Note that a subset of the client devices that may be camped on the same cell as the mobile Hotspot may continue to remain in the CBIBOS mode. According to an aspect of the present disclosure, if the mobile Hotspot determines that it can decode the broadcast SI from cell $C_b$ then the mobile Hotspot may decode and relay the broadcast SIs from the cell $C_b$ to the client devices as and when there is change in the SI from cell $C_b$ and both the mobile Hotspot and client devices enter the CBIBOS mode. Note that CBIBOS mode may be determined on a per cell basis, i.e., there may be CBIBOS mode information broadcast for a subset of client devices that may be camped on cell $C_a$ and there may be a separate CBIBOS mode information broadcast for a subset of client devices that may be camped on cell $C_b$. If there is another subset of client devices camped on yet another cell of the same RAT type and on the same frequency, then yet another separate CBIBOS mode for the SI of that cell may be supported, and so on. According to an aspect of the present disclosure, the client devices may disable the SI change notification processing and SI channel decode processing as long as they are connected to the mobile Hotspot and have entered the CBIBOS mode. According to an aspect of the present disclosure, when there is a cell reselection in either mobile Hotspot or one or more of the client devices then they may communicate with each other to determine whether they can continue to be in the CBIBOS mode or exit the CBIBOS mode. FIG. 13 illustrates an example scenario for the application of present disclosure where the mobile Hotspot 1304 is camped on the cell $C_a$ with CID 1015 and the Smartphone 1310 is camped on cell $C_b$ with CID 1013.

According to an aspect of the present disclosure, the "WWAN Camped on Cell Information Response" message may include, among other information, the change-mark of the most current SI it has decoded. This may enable the mobile Hotspot to determine whether it has the most current SI for the cell that the client device is camped on. If the mobile Hotspot does not have the most recent SI for the cell that the client device is camped on, the mobile Hotspot may acquire the most recent SI and may use its change-mark to detect any future change of SI. The mobile Hotspot may then determine whether it can enter the CBIBOS mode or not and may proceed accordingly.

According to an aspect of the present disclosure, when the mobile Hotspot receives the "WWAN Camped on Cell Information Response" message and if the mobile Hotspot is aware of an upcoming SI change or SI change is in progress for the cell the client device is camped on, the mobile Hotspot may wait till the completion of SI change and decode the most recent SI from the cell and then the mobile Hotspot may determine whether it can enter the CBIBOS mode or not and may proceed accordingly.

According to an aspect of the present disclosure, when the mobile Hotspot receives the "WWAN Camped on Cell Information Response" message and if the mobile Hotspot is aware of an upcoming SI change or SI change is in progress for the cell the client device is camped on, the mobile Hotspot may enter the CBIBOS mode but may not immediately send the SI message available in its storage rather it may decode the updated SI from the cell and then may send the updated SI to the client devices.

Figure 14:
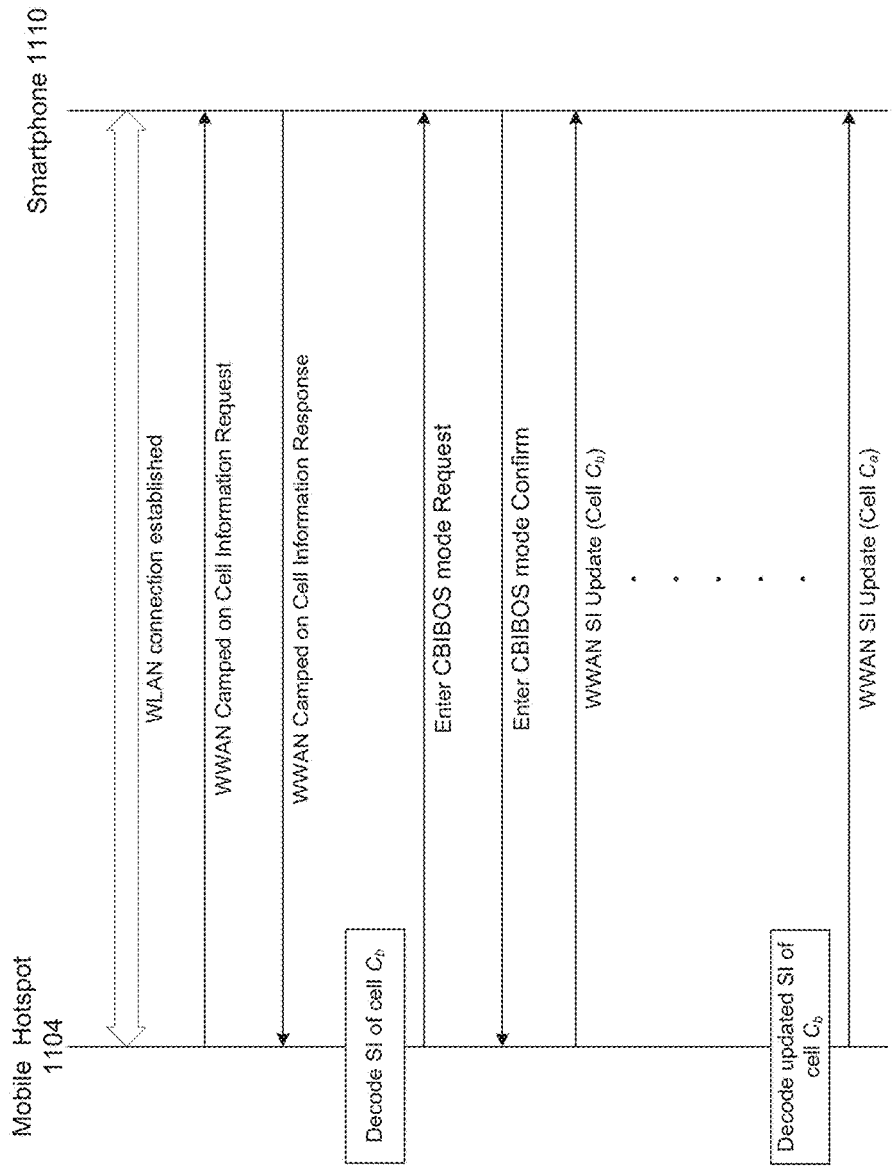
FIG. 14 illustrates an MSC for an example scenario for mobile Hotspot broadcasting SI on the WLAN SRWL for a cell different from the cell it is camped on according to the aspects of the present disclosure.

The MSC for the messages exchanged between the mobile Hotspot 1304 and the Smartphone 1310 over the WLAN link for entering the CBIBOS mode when they are camped on different cells of the same frequency, RAT type, and PLMN according to the aspects of the present disclosure are illustrated in FIG. 14. The message exchanges are similar to the case illustrated in FIG. 12 for the case when both the Hotspot and the Smartphone are camped on the same cell. The key difference is that the mobile Hotspot 1304 first determines whether it can decode the SIBs from cell $C_b$ or not and if it can do so, it may actually decode the SIBs from Cell $C_b$. Only after it has the SIBs of the cell $C_b$ is available to it, the mobile Hotspot 1304 sends the "Enter CBIBOS mode Request" message to the Smartphone 1310. Subsequently, after having entered the CBIBOS mode, the mobile Hotspot 1304 may continue to monitor the cell $C_b$ for change of SIBs. Eventually if there is a change in SIBs is detected, the mobile Hotspot 1304 decodes the updated SIBs and sends them to the Smartphone 1310.

According to an aspect of the present disclosure, if the mobile Hotspot and one or more client devices are currently camped on to the cells of the same RAT type but different frequencies, namely cells $C_{f1}$ and $C_{f2}$ respectively, then mobile Hotspot may first determine whether it can decode the SI from the cell $C_{f2}$ which may require the mobile Hotspot to tune to frequency f2 of the client device cell while monitoring its own serving cell frequency f1. According to an aspect of the present disclosure, if the mobile Hotspot determines that it cannot decode the broadcast SI from cell $C_{f2}$ then it may communicate to the one or more client devices that CBIBOS mode may not be possible for those client devices which are camped on cells using different frequencies from that of the mobile Hotspot. Note that a subset of the client devices that may be camped on the same cell as the mobile Hotspot and client devices that may be camped on cells with the same frequency as the mobile Hotspot may continue to remain in the CBIBOS mode. According to an aspect of the present disclosure, if the mobile Hotspot determines that it can decode the broadcast SI from cell $C_{f2}$ then the mobile Hotspot and client devices may enter the CBIBOS mode and the Hotspot may decode and relay the broadcast SIs from the cell $C_{f2}$ to the client devices as and when there is change in the SI from cell $C_{f2}$. Note that CBIBOS mode may be determined on a per cell basis, i.e., there may be CBIBOS mode information broadcast for a subset of client devices that may be camped on cell $C_{f1}$ and there may be a separate CBIBOS mode information broadcast for a subset of client devices that may be camped on cell $C_{f2}$. If there is another subset of client devices camped on yet another cell of the same RAT type and different frequency, then yet another separate CBIBOS mode for the SI of cells on that frequency may be supported, and so on. According to an aspect of the present disclosure, the client devices may disable the SI change notification processing and SI channel decode processing as long as they are connected to the mobile Hotspot and have entered the CBIBOS mode. According to an aspect of the present disclosure, when there is a cell reselection in either mobile Hotspot or one or more of the client devices then they may communicate with each other to determine whether they can continue to be in the CBIBOS mode or exit the CBIBOS mode.

According to an aspect of the present disclosure, if the mobile Hotspot and one or more client devices are currently camped on to the cells of different RAT type, namely cells $C_{RAT1}$ and $C_{RAT2}$ respectively, then mobile Hotspot may first determine whether it supports the RAT2 used by the client devices and whether it supports the particular frequencies used by the RAT2, and whether it can decode the SI from the cell $C_{RAT2}$ which may require the mobile Hotspot to tune to the frequency of $C_{RAT2}$ of the cell camped on by one or more client devices while monitoring its own serving cell $C_{RAT1}$ of RAT type RAT1. According to an aspect of the present disclosure, if the mobile Hotspot determines that it cannot decode the broadcast SI from cell $C_{RAT2}$ then it may communicate to the one or more client devices that CBIBOS mode may not be possible for those client devices which are camped on cells using different RAT type (RAT2) from that of the mobile Hotspot. Note that a subset of the client devices that may be camped on the same cell as the mobile Hotspot and client devices that may be camped on cells with the same and/or different frequency as the mobile Hotspot may continue to remain in the CBIBOS mode. According to an aspect of the present disclosure, if the mobile Hotspot determines that it can decode the broadcast SI from cell $C_{RAT2}$ then the mobile Hotspot and client devices may enter the CBIBOS mode and the Hotspot may decode and relay the broadcast SIs from the cell $C_{RAT2}$ to the client devices as and when there is change in the SI from cell $C_{RAT2}$. Note that CBIBOS mode may be determined on a per cell basis, i.e., there may be CBIBOS mode information broadcast for a subset of client devices that may be camped on cell $C_{RAT1}$ and there may be a separate CBIBOS mode information broadcast for a subset of client devices that may be camped on cell $C_{RAT2}$. If there is another subset of client devices camped on yet another cell of different RAT type and different frequency, then yet another separate CBIBOS mode for the SI of cells on that RAT type and frequency may be supported, and so on. According to an aspect of the present disclosure, the client devices may disable the SI change notification processing and SI channel decode processing as long as they are connected to the mobile Hotspot and have entered the CBIBOS mode. According to an aspect of the present disclosure, when there is a cell reselection in either mobile Hotspot or one or more of the client devices then they may communicate with each other to determine whether they can continue to be in the CBIBOS mode or exit the CBIBOS mode.

According to an aspect of the present disclosure, for the cases where the mobile Hotspot agrees with the client devices on monitoring and decoding SI for the client devices camped on the same cells or different cells that may be on different frequencies or different RAT types, the mobile Hotspot may monitor the downlink for all the agreed upon cells of different frequencies and RAT types. The mobile Hotspot may manage its downlink monitoring schedule accordingly for respective cells. Generally the SI change notification may be monitored through a paging message in the respective cells of the same or different frequencies and RAT types. The paging message transmission may follow a predetermined scheduling and a particular paging message transmission instance is referred herein as Paging Occasion (PO).

According to an aspect of the present disclosure, the mobile Hotspot may decide to monitor the PO for all the agreed upon cells on the same frequency or different frequencies and RAT types. According to an aspect of the present disclosure, the mobile Hotspot may compute the POs for all the cells on the same or different frequencies and RAT types to determine the non-overlapping POs which it can monitor for identifying the SI change for each the cells on the same or different frequencies and RAT types. Since the purpose of PO monitoring is only for SI change notification, the Hotspot may not be required to monitor the client device specific PO in a cell of the same or different frequencies and RAT types. According to an aspect of the present disclosure the mobile Hotspot may not monitor the same PO which the client devices are expected to monitor in a cell, frequency, or RAT type. According to an aspect of the present disclosure, the mobile Hotspot may just monitor one common default DRX cycle based PO per cell, frequency, or RAT type. This may give flexibility to the mobile Hotspot to choose non overlapping PO for all the frequencies, RAT types, and cells that it plans to monitor the PO for SI change notification.

Note that a change in the DRX cycle typically may change the PO for the client devices in that particular network. According to an aspect of the present disclosure, if the mobile Hotspot finds an overlap in the POs of different cells in the same or different frequencies and RAT types, then it may change its DRX cycle for one or more of the cells, frequencies, or RAT types to determine whether the change in DRX cycle could change the POs such that the POs overlap may be avoided. According to an aspect of the present disclosure, if the mobile Hotspot could not find the non-overlapping PO for the cells of the same or different frequencies and RAT types, then the mobile Hotspot may communicate the same to the affected client devices and exit the CBIBOS mode for those client devices.

Figure 15:
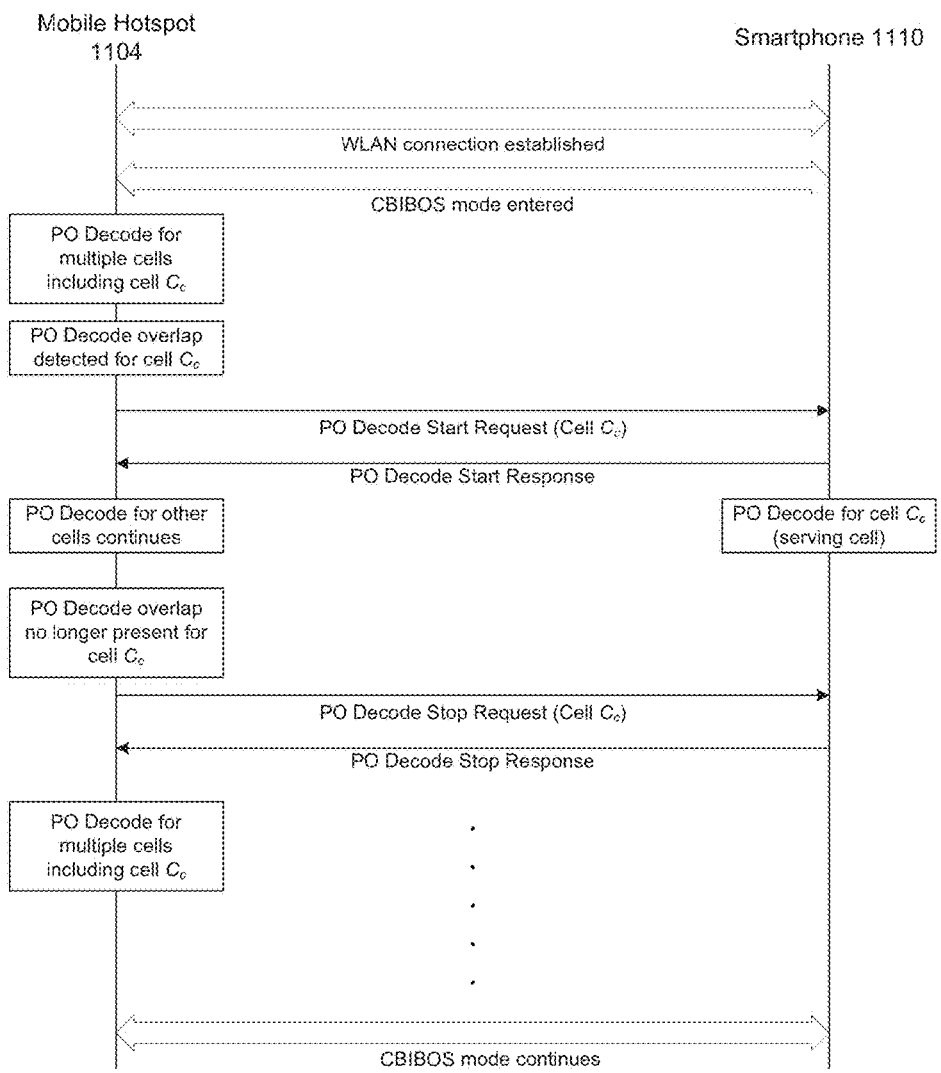
FIG. 15 illustrates an MSC for an example scenario for the handling of Paging Occasion (PO) overlap in a mobile Hotspot followed by a client device performing PO decoding and then eventual removal of PO overlap according to the aspects of the present disclosure.

According to an aspect of the present disclosure, when the mobile Hotspot attempts to decode SI for one or more of the cells of the same or different frequencies and RAT types, it may find an overlap with POs of other cells. In such a case, one of the two alternative methods as described next may be used. According to an aspect of the present disclosure, in the first alternative, the mobile Hotspot may first prioritize the cells of the same frequency and RAT type in which the mobile Hotspot is camped on. According to an aspect of the present disclosure, for the cells on other frequencies and RAT types, for which the mobile Hotspot sees an overlap of the PO, the mobile Hotspot may communicate to the client devices that it may not be able to decode the next PO for the client devices and request the client devices to perform the PO decode by themselves and, according to an aspect of the present disclosure, the mobile Hotspot may continue to be in CBIBOS mode with the client device. This example scenario is illustrated in the MSC contained in FIG. 15. At the beginning, the mobile Hotspot 1104 and the client device Smartphone 1110 have already entered into the CBIBOS mode. At this point, the mobile Hotspot may monitor the PO for all the required cells including the inter-frequency cell $C_c$ on which the client device Smartphone 1110 may be camped. Subsequently, for the current example scenario, the SI of the serving cell of the mobile Hotspot may change which may lead to PO overlap for the inter-frequency cell $C_c$. At this time, the mobile Hotspot may send the "PO Decode Start Request" message to the client device Smartphone 1110 which may accept the request and send the "PO Decode Start Response" message to the mobile Hotspot. Subsequently, the mobile Hotspot 1104 and the client device Smartphone 1110 may continue to decode their respective PO's. Subsequently, the SI of the serving cell of the mobile Hotspot may change which may lead to the removal of the PO overlap for the inter-frequency cell $C_c$. At this time, the mobile Hotspot 1104 may send the "PO Decode Stop Request" message to the client device Smartphone 1110 which may accept the request and send the "PO Decode Stop Response" message to the mobile Hotspot. From this point forward, the mobile Hotspot may continue to monitor the PO for all the required cells and the client device Smartphone 1110 may not monitor its own PO on the cell $C_c$.

Figure 16:
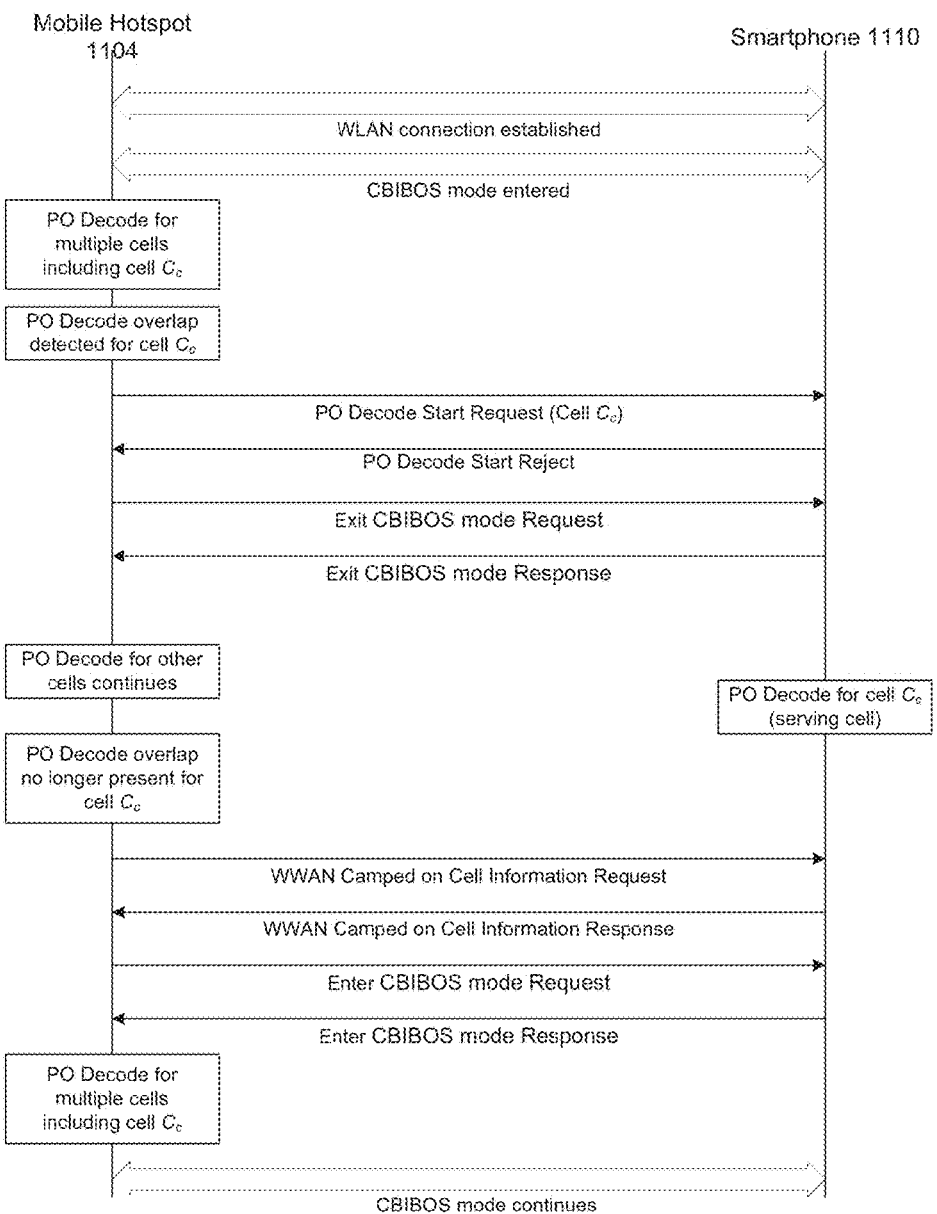
FIG. 16 illustrates an MSC for an example scenario for the handling of PO overlap in a mobile Hotspot followed by a client device rejecting PO decoding and then eventual removal of PO overlap according to the aspects of the present disclosure.

According to an aspect of the present disclosure, if the client device denies the request from the mobile Hotspot for decoding the PO and to continue to be in CBIBOS mode, then the mobile Hotspot may exit the CBIBOS mode with the client device and the client device may perform normal PO decode and SI decode by itself. According to an aspect of the present disclosure, after completing the ongoing SI decode, if the Hotspot finds the non overlapping PO for one or more of client devices for which it previously exited the CBIBOS mode or could not enter the CBIBOS mode because of the overlap in the PO in the past due to SI decode, the mobile Hotspot may send either "WWAN Camped on Cell Information Request" or "Enter CBIBOS mode request" to one or more of such client devices to request them to enter the CBIBOS mode. This example scenario is illustrated in the MSC contained in FIG. 16. At the beginning, the mobile Hotspot 1104 and the client device Smartphone 1110 have already entered into the CBIBOS mode. At this point, the mobile Hotspot 1104 monitors the PO for all the required cells including the inter-frequency cell $C_c$ on which the client device Smartphone 1110 may be camped. Subsequently, the SI of the serving cell of the mobile Hotspot may change which may lead to PO overlap for the inter-frequency cell $C_c$. At this time, the mobile Hotspot 1104 may send the "PO Decode Start Request" message to the client device Smartphone 1110 which may not accept the request and send the "PO Decode Start Reject" message to the mobile Hotspot. At this time, the mobile Hotspot 1104 may send the "Exit CBIBOS mode Request" message to the client device Smartphone 1110 which may accept the request and send the "Exit CBIBOS mode Response" message to the mobile Hotspot. Subsequently, the mobile Hotspot may continue to decode the POs for remaining required cells. The client device Smartphone 1110 may take necessary steps, including possibly acquiring updated SI, etc., to resume PO decoding on its own. Subsequently, the SI of the serving cell of the mobile Hotspot may change which may lead to the removal of the PO overlap for the inter-frequency cell $C_c$. At this time, the mobile Hotspot 1104 may send the "WWAN Camped on Cell Information Request" message to the client device Smartphone 1110 which may accept the request and send the "WWAN Camped on Cell Information Response" message to the mobile Hotspot. The mobile Hotspot 1104 may conclude that it is possible to enter the CBIBOS mode and may send a message "Enter CBIBOS mode Request" message to the client device Smartphone 1110 which in turn may accept the request and send the "Enter CBIBOS mode Confirm" message to the mobile Hotspot. From this point forward, the mobile Hotspot may continue to monitor the PO for all the required cells and the client device Smartphone 1110 may not monitor its own PO on the cell $C_c$.

According to an aspect of the present disclosure, in the second alternative, the mobile Hotspot may prioritize the PO decoding of cells of other frequencies and RAT types, since PO decoding may be typically a higher priority and the mobile Hotspot may defer the SI decode for cells on its camped on frequency and RAT type. This may be a preferred alternative as there is usually periodic broadcast of SIs from each cell of the same or different frequencies and RAT types. According to an aspect of the present disclosure, the mobile Hotspot may determine to defer the SI decode if the delayed decoding of SI may not impact the normal operation and performance of the mobile Hotspot.

According to an aspect of the present disclosure, the mobile Hotspot may decide not to monitor the PO of the cells of the same or different frequencies and RAT types and may rely on the client devices for monitoring PO in their respective cells of the same or different frequencies and RAT types. According to an aspect of the present disclosure, when one or more client devices detects the change in SI, notified by the network in the PO, then the client device(s) may communicate to the mobile Hotspot that there is change in SI in the respective cell of the same or different frequencies or RAT type and then the mobile Hotspot may decode the changed SI in the respective cell and broadcast the decoded SI to the one or more client devices.

According to an aspect of the present disclosure, when a mobile Hotspot may be built with multiple (for example, M) receiver/decoder circuits, it may decode in parallel even the overlapping POs and SIs from multiple (for example, N) cells of the same or different frequencies and RAT types. Note that M and N may not necessarily be the same.

According to an aspect of the present disclosure, when a client device goes out of range of the mobile Hotspot then it may exit CBIBOS mode and may start decoding the PO and/or SI on its own as normal.

According to an aspect of the present disclosure, when a client device disconnects with the mobile Hotspot then it may exit CBIBOS mode and may start decoding the PO and/or SI on its own as normal.

According to an aspect of the present disclosure, the mobile Hotspot at any point of time may communicate to client devices and may exit CBIBOS mode.

According to an aspect of the present disclosure, the mobile Hotspot may enter CBIBOS mode autonomously and may start broadcasting its current serving cell SI information. The mobile Hotspot may do this whenever a new client device gets connected to it. The mobile Hotspot may do this whenever there is an update or change in SI in its serving cell and the mobile Hotspot successfully decodes the updated SI.

According to an aspect of the present disclosure, the mobile Hotspot may be pre-configured with a set of cells of the same or different frequencies, and RAT type for which it is expected to monitor and/or decode SI change from the respective cells. The mobile Hotspot may enter CBIBOS mode autonomously and may start broadcasting the SIs for one or more of the pre-configured cells of the same or different frequencies and RAT types.

According to an aspect of the present disclosure, the mobile Hotspot may do the SI broadcast using an application which may run in the mobile Hotspot and in the client devices and the applications on the two entities may communicate through a peer to peer protocol on any logical channel of the underlying SRWL being used. According to an aspect of the present disclosure, the peer to peer application may be independent of the particular SRWL being used and it may be achieved through a virtual communication port established in both mobile Hotspot and in the client devices. The SRWL connection may be mapped to the virtual communication port and the applications may communicate using the virtual communication port. For example, in case of WLAN SRWL, it could be a Transmission Control Protocol/Internet Protocol (TCP/IP) socket based communication between the mobile Hotspot and the client devices.

According to an aspect of the present disclosure, the mobile Hotspot and the client devices may create a new physical or logical channel, namely Cellular Broadcast Information Channel (CBIC), which may be pre-negotiated and dedicated for the CBIBOS mode information exchange. This CBIC may be defined with a periodicity and time slot where the mobile Hotspot may broadcast the updated SI and the client devices may monitor the CBIC on a pre-defined agreed upon periodicity and time slot to receive the updated SI message from the mobile Hotspot. According to an aspect of the present disclosure the mobile Hotspot and the client device may use the CBIC for other cellular network information exchange (other than SI) between the client device and the mobile Hotspot.

According to an aspect of the present disclosure, when the mobile Hotspot broadcasts the SI messages, it may prefix each SI message with the SI change-mark index to ensure the client devices know the change-mark index of the SI broadcast by the mobile Hotspot. This may help the client devices to cope with the out of order reception of SI messages from the mobile Hotspot. According to an aspect of the present disclosure, if a client device connects with another mobile Hotspot in its vicinity which may also be broadcasting the SI message for the cells of the same or different frequencies and RAT types, then the client device may resume from the pending SI message decode instead of waiting for all the SI to be received from the new mobile Hotspot.

According to an aspect of the present disclosure, when a client device disconnects from the mobile Hotspot and if the client device is not able to find another mobile Hotspot in its current location, then client device may start decoding the SI directly from the WWAN.

A mobile Hotspot may be equipped with more than one source for primary sources of internet. For example, a mobile Hotspot may be equipped with a cable modem and a WWAN modem. According to an aspect of the present disclosure, a mobile Hotspot may be using the cable modem to provide internet service while it may be using the WWAN modem strictly for SI monitoring and decoding purposes, i.e., a mobile Hotspot need not be using the WWAN for providing internet service in order to only monitor the SI from WWAN cells.

A client device operating according to the aspects of the present disclosure may enter power save mode without monitoring change of SI and decoding of SI which may lead to reduce power consumption and extended battery life. According to an aspect of the present disclosure, when the client device enters the CBIBOS mode, the client device may turn off the RF receiver of the cellular modem during the SI change notification time slot and the SI change time slot and may enter a power save state. This may be a significant advantage for deeply embedded client devices powered with limited capacity batteries. For the case where the mobile Hotspot and client devices are camped on the same cell of the same frequency and the same RAT type, the mobile Hotspot need not do any additional decoding. This is likely to be the most common case when the mobile Hotspot and client devices have the service from the WWAN with the same PLMN. When a client device first connects with the mobile Hotspot, there is a high probability the client device may camp on to the same cell if both are getting service from the WWAN with the same PLMN, then the client device may get the updated SI sooner than compared to when it decodes on its own directly from the WWAN.

According to an aspect of the present disclosure the mobile Hotspot may save in its database the most recent SI messages decoded for its client device from a cell on the same or different frequencies and/or different RAT types. According to an aspect of the present disclosure, the mobile Hotspot may save in its database SI messages for R recent camped on or neighbor cells of the same or different frequencies and/or RAT type SI messages. Example values of R may be 10 or 20 or 50 and it may be determined based on simulation results or experiments and the value of R may be preconfigured in the mobile Hotspot.

According to as aspect of the present disclosure the mobile Hotspot may maintain the validity for the stored SI message in its database. The mobile Hotspot may maintain the validity by refreshing the validity duration every time it decodes a PO and detects there is SI change. The validity timer and the method to identify the validity for the stored SI may be different for cells of the same or different frequencies and/or RAT types.

The mobile Hotspot may do cell selection or reselection or change to a cell of the same or different frequencies and/or RAT types for which the mobile Hotspot may already have valid stored SI information which the mobile Hotspot may have decoded as part of SI monitor for client devices connected to it. According to an aspect of the present disclosure, the mobile Hotspot may use the valid stored SI information for a cell of the same or different frequencies and/or RAT types even though the stored SI message may have been decoded as part of SI monitoring for other client devices.

According to an aspect of the present disclosure, when the mobile Hotspot changes its serving cell due to cell selection or cell reselection or cell change or other procedure, the mobile Hotspot may broadcast its new cell information to the client devices.

According to an aspect of the present disclosure when a client device changes it serving cell due to cell selection or cell reselection or cell change or other procedure the client device may communicate its new cell information to the mobile Hotspot.

Figure 17:
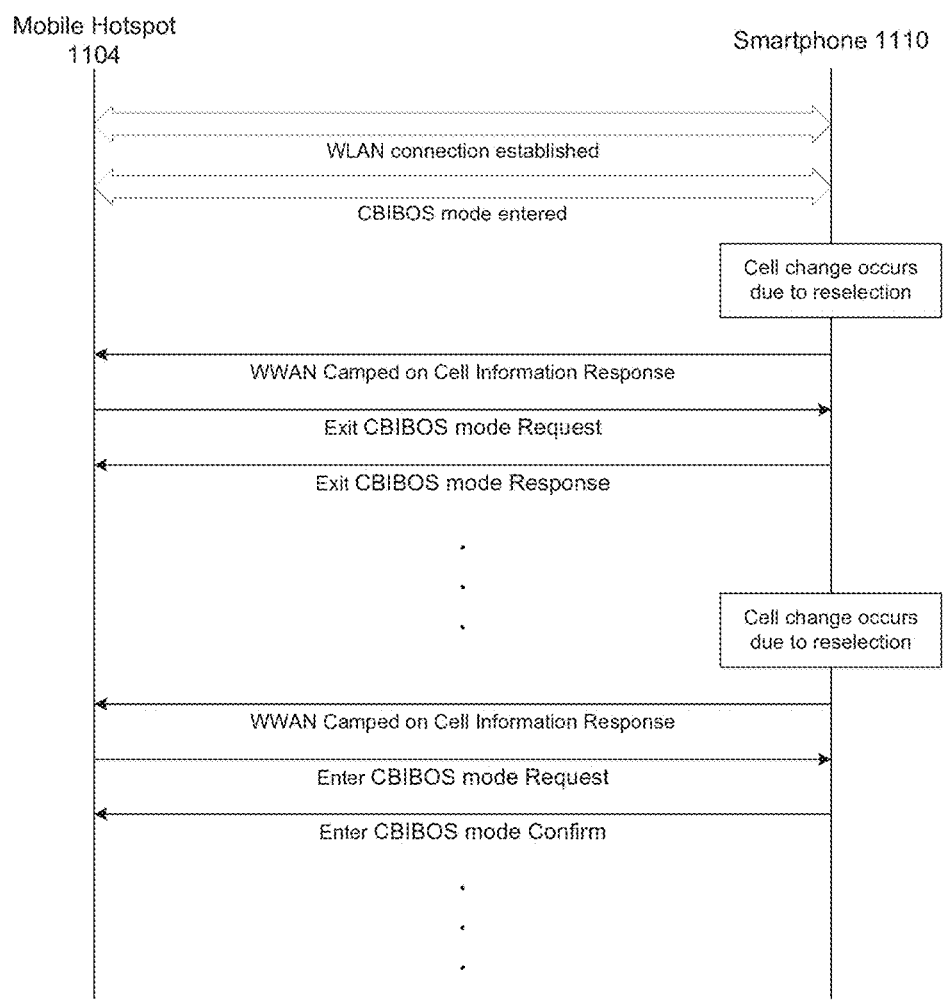
FIG. 17 illustrates an MSC for an example scenario for the handling of cell reselection by a client device leading to the end of Cellular Broadcast Information Broadcast over SRWL (CBIBOS) mode followed by another reselection leading to entering of CBIBOS mode according to the aspects of the present disclosure.

According to an aspect of the present disclosure, when the mobile Hotspot and the client devices are in CBIBOS mode and if a cell change occurs in either mobile Hotspot or in one or more of the client devices and if the mobile Hotspot may not able to continue the CBIBOS mode with one or more of the client devices then the mobile Hotspot may send "Exit CBIBOS mode Request" to one or more of the client devices and may exit the CBIBOS mode with those client devices. An example of this type of scenario is illustrated in FIG. 17 where initially the mobile Hotspot 1104 and the client device Smartphone 1110 are in CBIBOS mode. At some point the client device Smartphone 1110 may perform cell reselection and to ensure that the CBIBOS mode can be continued, it may send the "WWAN Camped on Cell Information Response" message to the mobile Hotspot to update its serving cell information. The mobile Hotspot 1104 may determine that it may not be able to support the CBIBOS mode for the client device Smartphone 1110 for the newly selected cell. Therefore, the mobile Hotspot 1104 may send the "Exit CBIBOS mode Request" message to the client device Smartphone 1110 which may accept the request and send the "Exit CBIBOS mode Response" message to the mobile Hotspot. At further later point in time, the client device Smartphone 1110 may perform another cell reselection and to ensure that the CBIBOS mode can be entered, it may send the "WWAN Camped on Cell Information Response" message to the mobile Hotspot to update its serving cell information. The mobile Hotspot 1104 may determine that it may be able to support the CBIBOS mode for the client device Smartphone 1110 for the newly selected cell. Therefore, the mobile Hotspot 1104 may send the "Enter CBIBOS mode Request" message to the client device Smartphone 1110 which may accept the request and send the "Enter CBIBOS mode Response" message to the mobile Hotspot. From this point forward, the mobile Hotspot may continue to monitor the PO and the SI for the serving cell of the client device Smartphone 1110.

Figure 18:
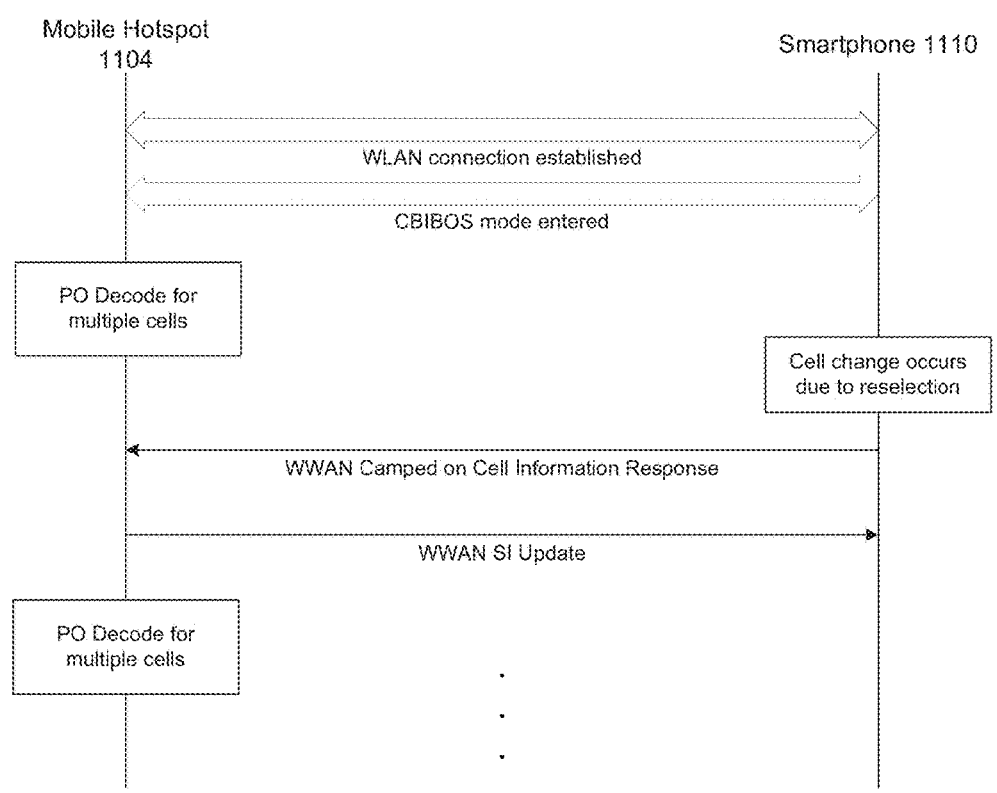
FIG. 18 illustrates an MSC for an example scenario for the handling of cell reselection by a client device to a cell for which the mobile Hotspot already has valid SI which it sends to the client device and continues the CBIBOS mode uninterrupted according to the aspects of the present disclosure.

According to an aspect of the present disclosure, when the mobile Hotspot receives a cell change notification from a client device and if the mobile Hotspot has valid stored SI information for the newly notified cell of the same or different frequencies and/or RAT types, then the mobile Hotspot may immediately send the valid stored SI information to the client device. This may potentially expedite the SI acquisition for the client device and may expedite the client device network access for a faster connection setup after cell change in the client device. An example scenario of this aspect is illustrated in FIG. 18 where initially the mobile Hotspot 1104 and the client device Smartphone 1110 are in CBIBOS mode. At some point, the client device Smartphone 1110 may perform cell reselection and may camp on a different cell. To ensure that the CBIBOS mode can be continued, the client device Smartphone 1110 may send the "WWAN Camped on Cell Information Response" message to the mobile Hotspot to update its serving cell information. The mobile Hotspot may look up its database of valid SI for various cells and may determine that it already has valid SI for the cell the client device Smartphone 1110 has newly camped on. The mobile Hotspot 1104 may immediately send the "WWAN SI Update" with the SI for the serving cell of the client device Smartphone 1110. The mobile Hotspot and the client device Smartphone 1110 continue to remain in the CBIBOS mode even after change of cell and the client device Smartphone 1110 did not have to decode the SI by itself.

Figure 19:
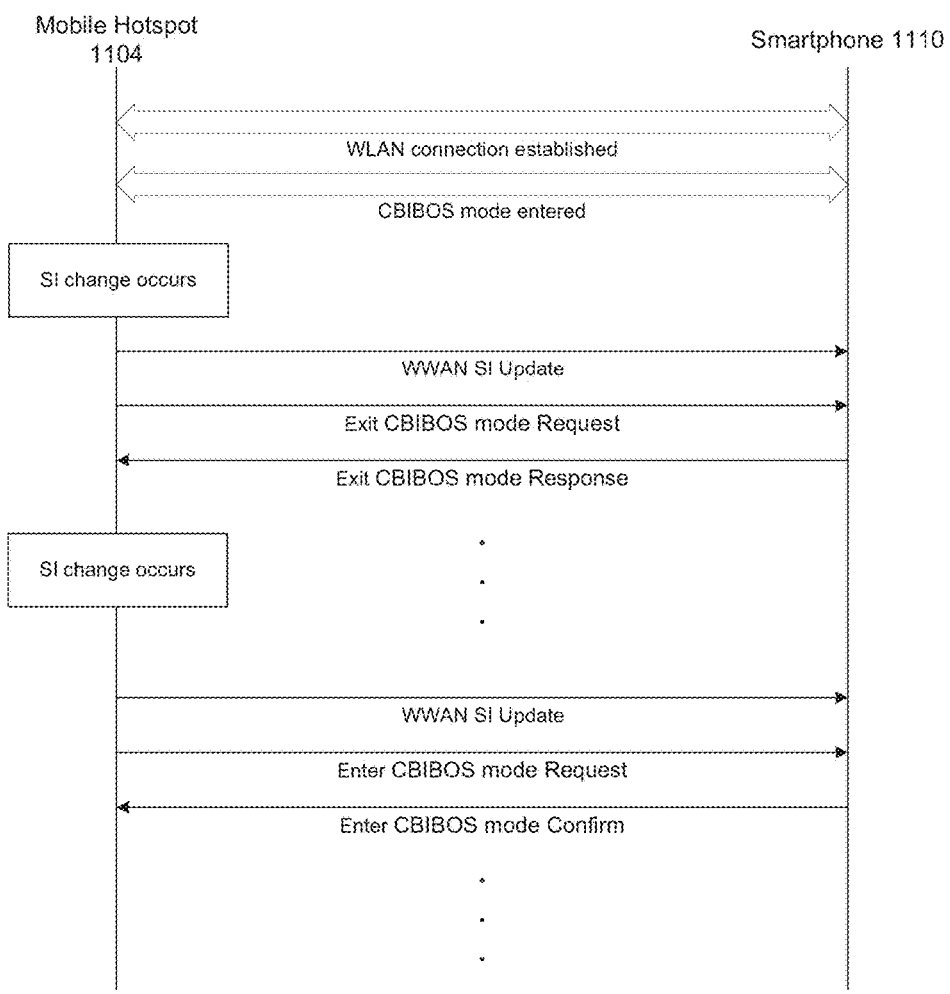
FIG. 19 illustrates an MSC for an example scenario for the handling of Discontinuous Reception (DRX) cycle change by leading to the end of CBIBOS mode followed by DRX cycle change leading to entering to CBIBOS mode according to the aspects of the present disclosure.

The network may update the default DRX cycle or paging cycle as part of SI change and which may change the PO to be monitored for the current serving cell for the mobile Hotspot. Sometimes a user may change the DRX cycle on the mobile Hotspot and which may also lead to change in the PO to be monitored for the current serving cell for the mobile Hotspot. According to an aspect of the present disclosure, when the mobile Hotspot and the client devices are in CBIBOS mode and if there is a change in the PO to be monitored for the Hotspot serving cell the mobile Hotspot may not able to continue the CBIBOS mode with one or more of the client devices then the mobile Hotspot may send "Exit CBIBOS mode Request" to one or more of the client devices and may exit the CBIBOS mode with those client devices. An example of MSC for handling this type of scenario is illustrated in FIG. 19 where initially the mobile Hotspot 1104 and the client device Smartphone 1110 are in CBIBOS mode. At some point the SI of the camped on cell of the client device Smartphone 1110 may be updated by the network and to ensure that the CBIBOS mode can be continued, the mobile Hotspot may send the "WWAN SI Update" message to the client device Smartphone 1110. The mobile Hotspot 1104 may determine that it may not be able to support the CBIBOS mode for the client device Smartphone 1110 for the updated DRX cycle in the new SI. Therefore, the mobile Hotspot 1104 may send the "Exit CBIBOS mode Request" message to the client device Smartphone 1110 which may accept the request and send the "Exit CBIBOS mode Response" message to the mobile Hotspot. At further later point in time, the SI of the camped on cell of the client device Smartphone 1110 may be updated by the network and the mobile Hotspot may send the "WWAN Camped on Cell Information Response" message to the mobile Hotspot to update its serving cell information. The mobile Hotspot 1104 may determine that it may be able to support the CBIBOS mode for the client device Smartphone 1110 for the updated DRX cycle in the newly updated SI. Therefore, the mobile Hotspot 1104 may send the "Enter CBIBOS mode Request" message to the client device Smartphone 1110 which may accept the request and send the "Enter CBIBOS mode Response" message to the mobile Hotspot. From this point forward, the mobile Hotspot may continue to monitor the PO and the SI for the serving cell of the client device Smartphone 1110.

Although the mobile Hotspot monitors the SI messages for the client devices and receives the SI messages from the cells of the same or different frequencies and RAT types, and sends the SI messages to the client devices, the mobile Hotspot may not parse or interpret the SI messages that are received for the client devices. As part of the SI update, the default DRX cycle or paging cycle may change for the cells of the same or different frequencies and/or RAT types that are monitored for the client devices. According to an aspect of the present disclosure, if a client device detects a change in the default DRX cycle or paging cycle which may change the default PO to be monitored in its current serving cell then the client device may communicate the changed default DRX cycle or paging cycle to the mobile Hotspot. According to an aspect of the present disclosure, the mobile Hotspot may parse or interpret a selective list of SI messages that are received from the serving cell of a client device, to obtain the default DRX cycle or paging cycle change in any of the client device serving cell and the mobile Hotspot may adopt the PO monitoring for the client device serving cell as per the updated PO. According to an aspect of the present disclosure, when there is a change in the PO for the client device's serving cell, the mobile Hotspot may not be able to continue to monitor the new PO because of overlap in PO and in such a case the mobile Hotspot may send "Exit CBIBOS mode Request" to one or more of the client devices and may exit the CBIBOS mode with those client devices.

Although the term "mobile Hotspot" is used herein to describe the various aspects of the present disclosure, the disclosure may be applicable to any Hotspot that may be using a WWAN and the Hotspot may not necessarily be mobile. Furthermore, the connectivity between the Hotspot device and the client devices may not necessarily be SRWL. For example, the Hotspot device and the client devices may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the client devices may be connected to the Hotspot over Ethernet for internet connection but may continue to use the WWAN for other services. In this case the Hotspot may use its own WWAN modem to decode the SI of the cell on which the client device is camped and provide any updated SIs to the client devices over the Ethernet. In another example, a client device may be connected to a Personal Computer (PC) that has a built-in WWAN modem. The client device may be connected to the PC over a USB cable for charging and/or transferring music, images, videos, etc. between the PC and the client device. In this case, the PC may be in the equivalent role of a Hotspot. The PC may use its WWAN modem to decode the SI of the cell on which the client device is camped and provide any updated SIs to the client devices over the USB cable.

The invention claimed is:

1. A method for communication of Wireless Wide Area Network (WWAN) broadcast information in a wireless communication network, the method comprising:
controlling, by a processing device,
transmitting a first WWAN broadcast information message from a hotspot device, over a communication connection, to a client device, and
receiving, at the hotspot device, over the communication connection, a second WWAN broadcast information message transmitted from the client device, responsive to the first WWAN broadcast information message,
wherein the first and second WWAN broadcast information messages indicate first and second WWAN capabilities respectively of the hotspot device and the client device, and
in which the communication connection is a Short Range Wireless Link (SRWL) or a wired connection.

2. The method of claim 1, wherein the first and second WWAN capabilities indicate first and second Radio Access Technologies (RAT) types supported respectively by the hotspot device and the client device.

3. The method of claim 1, wherein the first and second WWAN capabilities support at least one of Code Division Multiple Access (CDMA), Global System for Mobile communication (GSM), Long Term Evolution (LTE) from the 3rd Generation Partnership Project (3GPP) or General Packet Radio Service (GPRS).

4. The method of claim 1, wherein the first and second WWAN broadcast information messages indicate at least one of current WWAN identity, Radio Access Technology (RAT) type, Cell Identity (CID), Tracking Area Identity (TAI), frequency of a channel, a default Discontinuous Reception (DRX) cycle or paging cycle for a cell on which respectively the hotspot device and the client device is camped.

5. The method of claim 1, further comprising:
controlling, by the processing device, when the mobile Hotspot and the client device are currently camped on to a same cell of a same Radio Access Technology (RAT) type on a same frequency, determining whether to broadcast base station broadcast system information (SI) to the client device based on a change in the SI from the same cell.

6. The method of claim 5, further comprising:
controlling, by the processing, when the hotspot device and the client device are currently camped on to the same cell of the same RAT type on the same frequency,
transmitting, from the hotspot device, a WWAN Camped-on Cell Information Request message to the client device,
receiving, in response to the WWAN Camped-on Cell Information Request message, from the client device a WWAN Camped on Cell Information Response message indicating at least one of RAT type, Cell Identity (CID), Tracking Area Identity (TAI), frequency of a channel, Public Land Mobile Network Identity (PLMN ID) of the cell on which the client device is camped,
transmitting a Cellular Broadcast Information Broadcast (CBIBOS) mode entry request from the hotspot device to the client device over the communication connection, and
when a CBIBOS mode entry confirmation is received from the client device at the hotspot device responsive to the CBIBOS mode entry request, transmitting current SI information for the same cell from the hotspot device to the client device,
in which SI change notification processing and SI channel decode processing are disabled at the client device when the client device is in the CBIBOS mode and connected to the hotspot device.

7. The method of claim 6, further comprising:
controlling, by the processing, when cell reselection is determined to occur in the hotspot device and the client device, determining whether the hotspot device and the client device can continue to be in the CBIBOS mode.

8. The method of claim 6, wherein the WWAN Camped on Cell Information Response message indicates at least one of a change-mark of a most current SI the client device has decoded.

9. The method of claim 6, further comprising:
controlling, by the processing device, when the WWAN Camped on Cell Information Response message is received from the client device at the hotspot device and a determination at the hotspot device is an upcoming SI change or SI change is in progress for the cell on which the client device is camped, decoding the most recent SI from the cell on which the client device is camped after completion of the SI change and, after the decoding, determining whether the CBIBOS mode can be entered.

10. The method of claim 6, further comprising:
controlling, by the processing device, when the WWAN Camped on Cell Information Response message is received from the client device at the hotspot device and a determination at the hotspot device is an upcoming SI change or SI change is in progress for the cell on which the client device is camped, without transmitting an SI message in a storage of the hotspot device, entering the CBIBOS mode, decoding an updated SI from the cell on which the client device is camped after completion of the SI change and transmitting the updated SI to the client device.

11. The method of claim 1, further comprising:
controlling, by the processing device,
when the mobile Hotspot and the client device are currently camped on respectively to different first and second cells having a same Radio Access Technology (RAT) type and on a same frequency, determining whether base station broadcast system information (SI) from the second cell is decodable,
when the SI from the second cell is determined not to be decodable, transmitting a first message to the client device over the communication connection that Cellular Broadcast Information Broadcast (CBIBOS) mode is not possible, and
when the SI from the second cell is determined to be decodable, transmitting a second message to the client device over the communication connection that the CBIBOS mode is possible and current SI information for the second cell when there is a change in the SI information for the second cell and the hotspot device and the client device are in the CBIBOS mode,
in which SI change notification processing and SI channel decode processing are disabled at the client device when the client device is in the CBIBOS mode and connected to the hotspot device.

12. The method of claim 11, further comprising:
controlling, by the processing, when cell reselection is determined to occur in the hotspot device and the client device, determining whether the hotspot device and the client device can continue to be in the CBIBOS mode.

13. The method of claim 1, further comprising:
controlling, by the processing device,
when the hotspot device and the client device are currently camped on respectively to different first and second cells having a same Radio Access Technology (RAT) type and different first and second frequencies, determining whether base station broadcast system information (SI) from the second cell is decodable with the hotspot device tuned to the second frequency while monitoring the first frequency,
when the SI from the second cell is determined to be not decodable, transmitting a first message to the client device over the communication connection that Cellular Broadcast Information Broadcast (CBIBOS) mode is not possible for a given client device camped on to a given cell using a frequency other than the first frequency, and
when the SI from the second cell is determined to be decodable, transmitting a second message to the client device over the communication connection that the CBIBOS mode is possible for the client device, and SI information broadcast from the second cell when SI information from the second cell is changed,
in which SI change notification processing and SI channel decode processing are disabled at the client device when the client device is in the CBIBOS mode and connected to the mobile hotspot device.

14. The method of claim 13, further comprising:
controlling, by the processing, when cell reselection is determined to occur in the hotspot device or the client device, determining whether the hotspot device and the client device can continue to be in the CIBOBS mode.

15. The method of claim 1, further comprising:
controlling, by the processing device,
when the mobile Hotspot and the client device are currently camped on respectively to different first and second cells having different first and second Radio Access Technology (RAT) types, determining whether the second RAT type and each frequency of the second RAT type are supported at the hotspot device and whether SI from the second cell, which requires the hotspot device to tune to a given second frequency of the second cell while the hotspot device monitors a given first frequency of the first cell tuned to the given first frequency while monitoring the given second frequency, is decodable at the hotspot device, when the SI from the second cell is determined to be not decodable, transmitting a first message over the communication connection that Cellular Broadcast Information Broadcast (CBIBOS) mode is not possible for a given client device camped on to a given cell using a RAT type other than the first RAT type, and
when the SI from the second cell is determined to be decodable, transmitting a second message to the client device over the communication connection that the CBIBOS mode is possible for the client device, and SI information broadcast from the second cell when SI information from the second cell is changed,
in which SI change notification processing and SI channel decode processing are disabled at the client device when the client device is in the CIBOBS mode and connected to the hotspot device.

16. The method of claim 15, further comprising:
controlling, by the processing, when cell reselection is determined to occur in the hotspot device or the client device, determining whether the hotspot device and the client device can continue to be in the CIBOBS mode.

17. The method of claim 1, further comprising:
controlling, by the processing device,
when a determination is the hotspot device agrees with the client device on monitoring and decoding base station broadcast system information (SI) for the client device, in which the client device is camped on a same or different cell from a cell on which the hotspot device is camped and using a same or different frequency or Radio Access Technology (RAT) type as the hotspot device, monitoring at the hotspot device a downlink for each agreed upon cell of different frequencies and RAT type.

18. The method of claim 17, further comprising:
controlling, by the processing device, deciding whether to monitor a Paging Occasion (PO) for each of the agreed upon cells on the same or different frequency and RAT type as the hotspot device.

19. The method of claim 18, further comprising:
controlling, by the processing device, determining at the hotspot device POs for all of the agreed upon cells on the same or different frequency and RAT type to determine each non-overlapping PO which the hotspot device can monitor for identifying an SI change for each of the cells agreed upon on the same or different frequency and RAT type.

20. The method of claim 19, further comprising:
controlling, by the processing device, not monitoring by the hotspot device a same PO which the client device is expected to monitor in a given cell, given frequency, or given RAT type.

21. The method of claim 19, further comprising:
controlling, by the processing device, monitoring by the hotspot device one common default Discontinuous Reception (DRX) cycle based PO per given cell, given frequency, or given RAT type.

22. The method of claim 19, further comprising:
controlling, by the processing device, when an overlap in given POs of different cells in the same or different frequencies and RAT types is determined at the hotspot device for the client device, changing a given Discontinuous Reception (DRX) cycle for one or more cells, frequencies, or RAT types to determine whether a change in the DRX cycle changes the POs to avoid POs overlap.

23. The method of claim 22, further comprising:
controlling, by the processing device, when non-overlapping PO for the cells of the same or different frequencies and RAT types is not determined at the hotspot device, transmitting from the hotspot device a first message indicating the non-overlapping determination to the client and exiting Cellular Broadcast Information Broadcast (CBIBOS) mode for the client device.

24. The method of claim 18, further comprising:
controlling, by the processing device,
when an overlap with a Paging Occasion (PO) of another cell is determined based on decoding SI for one or more of second cells of the same or different frequencies and RAT types,
prioritizing PO decoding on each cell of the second cells of the same frequency and RAT type on which the hotspot device is camped, and
for each cell of the second cells on another frequency and RAT type for which the hotspot device determines an overlap of the PO, transmitting to the client device a first message indicating a next PO may not be decodable by the hotspot device and requesting the client device to perform PO decode, and maintaining the hotspot device in Cellular Broadcast Information Broadcast (CBIBOS) mode with the client device.

25. The method of claim 24, further comprising:
controlling, by the processing device,
when a determination at the hotspot device is the client device denied the request from the hotspot device for decoding the PO and to continue to be in the CBIBOS mode, exiting the CBIBOS mode with the client device.

26. The method of claim 24, further comprising:
controlling, by the processing device, when an ongoing SI decode is completed at the hotspot device and a determination is a non-overlapping PO exists for one or more of second client devices for which the hotspot device previously exited the CBIBOS mode or could not enter the CBIBOS mode because of previous overlap in the PO due to SI decode, the transmitting at least one of a WAN Camped on Cell Information Request or Enter CBIBOS mode request to the one or more of second client devices as a request to enter the CBIBOS mode.

27. The method of claim 18, further comprising:
controlling, by the processing device,
when an overlap with the PO of another cell is determined based on decoding SI for one or more of second cells of the same or different frequencies and RAT types,
prioritizing PO decoding each cell of the second cells of other frequency and RAT type, and deferring SI decode for each cell of the second cells camped on a frequency and RAT type of the hotspot device.

28. The method of claim 27, wherein the deferring the SI decode is based on a determination whether delayed decoding of SI impacts normal operation and performance of the hotspot device.

29. The method of claim 1, further comprising:
controlling, by the processing device, not monitoring Paging Occasions (PO) of cells of same or different frequencies and Radio Access Technology (RAT) types by the hotspot device, in which the client device monitors PO in respective cells thereof of the same or different frequencies and RAT types.

30. The method of claim 29, further comprising:
controlling, by the processing device, when a first message is received at the hotspot device from the client device which detects change in base station broadcast system information (SI), notified by the network in the PO, in which the first message indicates change in SI in the respective cell of the same or different frequencies or RAT type, decoding the changed SI in the respective cell and transmitting the decoded SI to the client device.

31. The method of claim 1, further comprising:
controlling, by the processing device, when the hotspot device includes a plurality of M receiver/decoder circuits, decoding in parallel overlapping Paging Occasions (POs) and System Informations (SI) from a plurality of N cells of same or different frequencies and RAT types, in which M and N are the same or different.

32. The method of claim 1, further comprising:
controlling, by the processing device, receiving a first message from the client device indicating the client device exited Cellular Broadcast Information Broadcast (CBIBOS) mode and is to start decoding at least one of a Paging Occasion (PO) or base station broadcast system information (SI) according to a normal process at the client device, in which the first message is transmitted when the client device is out of range of or disconnected from the hotspot device.

33. The method of claim 1, further comprising:
controlling, by the processing device, exiting of a Cellular Broadcast Information Broadcast (CBIBOS) mode at any time and transmitting a third message to the client device indicating the exiting of the CBIBOS mode.

34. The method of claim 1, further comprising:
controlling, by the processing device, entering a Cellular Broadcast Information Broadcast (CBIBOS) mode autonomously at the hotspot device and starting broadcasting current serving cell base station broadcast system information (SI), when a new client device is connected to the hotspot device or the SI in the hotspot device's serving cell is updated or changed and the updated or changed SI is successfully decoded by the hotspot device.

35. The method of claim 1, further comprising:
controlling, by the processing device, when the hotspot device is pre-configured with a set of cells of same or different frequencies and Radio Access Technology (RAT) type for which the hotspot device expected to at least one of monitor or decode base station broadcast system information (SI) change from respective cells, autonomously entering Cellular Broadcast Information Broadcast (CBIBOS) mode at the hotspot device and starting broadcasting SIs for one or more of the pre-configured cells of the same or different frequencies and RAT types.

36. The method of claim 1, further comprising:
controlling, by the processing device, performing base station broadcast system information (SI) broadcasting using a first application being executed in the hotspot device, in which the client device is executing a second application and the first and second applications communicate through a peer to peer protocol on any logical channel of the communication connection.

37. The method of claim 36, wherein the first and second applications are independent of the communication connection and obtained through a virtual communication port established in the hotspot device and the client device.

38. The method of claim 1, further comprising:
controlling, by the processing device, creating a new physical or logical channel as a Cellular Broadcast Information Channel (CBIC) between the hotspot device and the client device dedicated for Cellular Broadcast Information Broadcast (CBIBOS) mode information exchange.

39. The method of claim 38, wherein the CBIC is available for exchange of cellular network information other than base station broadcast system information (SI) between the client device and the hotspot device.

40. The method of claim 1, further comprising:
controlling, by the processing device, when the hotspot device broadcasts a base station broadcast system information (SI) message, prefixing each SI message with a SI change-mark index.

41. The method of claim 1, wherein the hotspot device uses a cable modem to provide internet service while using a WWAN modem only for base station broadcast system information (SI) monitoring and decoding purposes.

42. The method of claim 1, further comprising:
controlling, by the processing device, saving in a database of the hotspot device most recent base station broadcast system information (SI) messages decoded for the client device from a cell on a same or different frequencies and same or different Radio Access Technology (RAT) types as a cell on which the hotspot device is camped.

43. The method of claim 42, wherein SI messages for R recent camped on or neighbor cells of the same or different frequencies or RAT type SI messages are saved in the database.

44. The method of claim 42, further comprising:
controlling, by the processing device, maintaining validity of one of the stored SI messages in the database.

45. The method of claim 44, further comprising:
controlling, by the processing device, using valid stored SI information for the cell of the same or different frequencies and RAT type, when the stored SI message is decoded as part of SI monitoring for another client device.

46. The method of claim 1, further comprising:
controlling, by the processing device, when the hotspot device changes a serving cell thereof due to cell selection, cell reselection, cell change or another procedure, broadcasting by the hotspot device of new cell information to the client device.

47. The method of claim 1, further comprising:
controlling, by the processing device, receiving new cell information from the client device at the hotspot device, the new cell information indicating change of serving cell at the client device due to cell selection or cell reselection or cell change or other procedure.

48. The method of claim 1, further comprising:

controlling, by the processing device, when the hotspot device and the client device are in Cellular Broadcast Information Broadcast (CBIBOS) mode and a cell change occurs in the hotspot device or the client device and the hotspot device is not able to continue the CBIBOS mode with the client device, sending from the hotspot device an Exit CBIBOS mode Request to the client device and exiting the CBIBOS mode with the client device.

49. The method of claim 1, further comprising:

controlling, by the processing device, when the hotspot device receives a cell change notification from the client device and valid base station broadcast system information (SI) for a newly notified cell of same or different frequencies and RAT type is stored at the hotspot device, immediately sending the valid SI information to the client device.

50. The method of claim 1, further comprising:

controlling, by the processing device, when the hotspot device and the client device are in the Cellular Broadcast Information Broadcast (CBIBOS) mode and based on a change in a Paging Occasion (PO) to be monitored for a serving cell of the hotspot device when the hotspot device is not able to continue the CBIBOS mode with the client device, sending an Exit CBIBOS mode Request to the client device and exiting the CBIBOS mode with the client device.

51. The method of claim 1, further comprising:

controlling, by the processing device, receiving at the hotspot device a first message from the client device indicating a changed default Discontinuous Reception (DRX) cycle or paging cycle detected at the client device.

52. The method of claim 51, further comprising:

controlling, by the processing device, processing a selective list of base station broadcast system information (SI) messages received from a serving cell of the client device, to obtain the changed default DRX cycle or paging cycle in the serving cell of the client device and adopting Paging Occasion (PO) monitoring for the serving cell of the client device according to an updated PO.

53. The method of claim 52, further comprising:

controlling, by the processing device, when the PO for the serving cell of the client device is changed to a new PO and the hotspot device cannot continue to monitor the new PO because of overlap in PO, sending an Exit CBIBOS mode Request" to the client device and exiting the CBIBOS mode with the client device.

54. An apparatus for communication of Wireless Wide Area Network (WWAN) broadcast information in a wireless communication network, the apparatus comprising:

circuitry configured to control:

transmitting a first WWAN broadcast information message from a hotspot device, over a communication connection, to a client device, and receiving, at the hotspot device, over the communication connection, a second WWAN broadcast information message transmitted from the client device, responsive to the first WWAN broadcast information message, wherein the first and second WWAN broadcast information messages indicate first and second WWAN capabilities respectively of the hotspot device and the client device, and in which the communication connection is a Short Range Wireless Link (SRWL) or a wired connection.

55. A wireless communication device comprising:

a receiver to receive a signal of a wireless communication system; and a processing device configured to control communication of Wireless Wide Area Network (WWAN) broadcast information in a wireless communication network, wherein the processing device is configured to control:

transmitting a first WWAN broadcast information message from the wireless communication device as a hotspot device, over a communication connection, to a client device, and receiving, at the wireless communication device, over the communication connection, a second WWAN broadcast information message transmitted from the client device, responsive to the first WWAN broadcast information message, wherein the first and second WWAN broadcast information messages indicate first and second WWAN capabilities respectively of the wireless communication device and the client device, and in which the communication connection is a Short Range Wireless Link (SRWL) or a wired connection.

* * * * *